United States Patent
Szatmary et al.

(10) Patent No.: US 12,524,016 B2
(45) Date of Patent: Jan. 13, 2026

(54) SYSTEMS AND METHODS FOR PRESERVING DATA AND HUMAN CONFIDENTIALITY DURING FEATURE IDENTIFICATION BY ROBOTIC DEVICES

(71) Applicant: Brain Corporation, San Diego, CA (US)

(72) Inventors: Botond Szatmary, San Diego, CA (US); David Ross, San Diego, CA (US)

(73) Assignee: Brain Corporation, San Diego, CA (US)

(*) Notice: Subject to any disclaimer, the term of this patent is extended or adjusted under 35 U.S.C. 154(b) by 319 days.

(21) Appl. No.: 18/101,288

(22) Filed: Jan. 25, 2023

(65) Prior Publication Data

US 2023/0168689 A1   Jun. 1, 2023

Related U.S. Application Data

(63) Continuation of application No. PCT/US2021/070987, filed on Jul. 27, 2021.
(Continued)

(51) Int. Cl.
*G05D 1/00* (2024.01)
*G06V 10/141* (2022.01)
(Continued)

(52) U.S. Cl.
CPC ......... *G05D 1/0274* (2013.01); *G05D 1/0246* (2013.01); *G06V 10/141* (2022.01);
(Continued)

(58) Field of Classification Search
CPC .. G05D 1/0274; G05D 1/0246; G06V 10/141; G06V 20/58; G06V 40/10; G06V 40/20
See application file for complete search history.

(56) References Cited

U.S. PATENT DOCUMENTS 9,324,190 B2 *   4/2016   Bell ................... H04N 13/156
10,296,663 B2 *  5/2019   Jovanovic ............ G06F 3/0488
(Continued)

FOREIGN PATENT DOCUMENTS

CN   108427911 A  *  8/2018  ............ G07C 9/257
CN   111241989 A  *  6/2020  ............ G06V 40/45
(Continued)

OTHER PUBLICATIONS

International Search Report and Written Opinion for PCT/US21/70987 dated Dec. 1, 2021.

*Primary Examiner* — Redhwan K Mawari
(74) *Attorney, Agent, or Firm* — Pierson Ferdinand LLP; Sidharth Kapoor

(57) ABSTRACT

Systems and methods for data and confidentiality preservation for feature identification by robotic devices are disclosed herein. According to at least one non-limiting exemplary embodiment, a method for determining if an image depicts a human is disclosed. The determination may be utilized to either (i) censor the face of the human, or (ii) identify features within the image. The determination enhances feature identification by ensuring only uncensored and unobscured images are provided to one or more models for the identification to preserve human confidentiality.

17 Claims, 14 Drawing Sheets

Related U.S. Application Data

(60) Provisional application No. 63/056,790, filed on Jul. 27, 2020.

(51) Int. Cl.
    *G06V 20/58*     (2022.01)
    *G06V 40/10*     (2022.01)
    *G06V 40/20*     (2022.01)

(52) U.S. Cl.
    CPC .............. *G06V 20/58* (2022.01); *G06V 40/10* (2022.01); *G06V 40/20* (2022.01)

(56) References Cited

U.S. PATENT DOCUMENTS

| | | | | |
|---|---|---|---|---|
| 10,339,384 | B2* | 7/2019 | Lorenzo | G06V 20/20 |
| 10,403,054 | B2* | 9/2019 | Moncayo | G06T 19/20 |
| 2003/0163233 | A1* | 8/2003 | Song | G06Q 10/06 701/31.4 |
| 2012/0162366 | A1* | 6/2012 | Ninan | H04N 13/289 348/43 |
| 2012/0185094 | A1* | 7/2012 | Rosenstein | B25J 5/007 901/1 |
| 2012/0316680 | A1 | 12/2012 | Olivier, III et al. | |
| 2015/0347814 | A1* | 12/2015 | Sheng | G06V 40/197 382/103 |
| 2017/0031366 | A1 | 2/2017 | Shamlian et al. | |
| 2018/0207791 | A1* | 7/2018 | Szatmary | G05D 1/0238 |
| 2018/0314850 | A1* | 11/2018 | Li | G06F 21/6245 |
| 2019/0104256 | A1* | 4/2019 | Marino | H04N 5/268 |
| 2019/0303651 | A1* | 10/2019 | Gallagher | G06V 40/168 |
| 2020/0018606 | A1 | 1/2020 | Wolcott et al. | |
| 2020/0293762 | A1* | 9/2020 | Zhang | H04W 4/80 |
| 2021/0270624 | A1* | 9/2021 | Kang | G01C 21/362 |
| 2022/0172518 | A1* | 6/2022 | Tang | G06V 10/443 |

FOREIGN PATENT DOCUMENTS

| | | | | |
|---|---|---|---|---|
| DE | 112019000040 T5 | * | 1/2020 | ............ G06V 40/28 |
| EP | 3751765 A1 | * | 12/2020 | ............ H04L 1/0013 |
| JP | 2010288020 A | * | 12/2010 | |
| KR | 20170012287 A | * | 2/2017 | ............ G06V 40/193 |
| KR | 101779961 B1 | * | 10/2017 | |

* cited by examiner

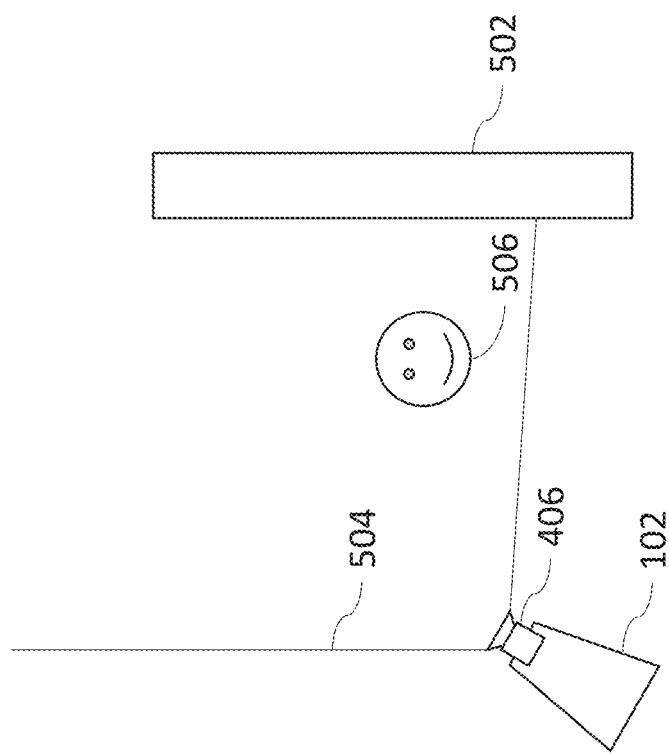

SYSTEMS AND METHODS FOR PRESERVING DATA AND HUMAN CONFIDENTIALITY DURING FEATURE IDENTIFICATION BY ROBOTIC DEVICES

PRIORITY

This application is a continuation of International Patent Application No. PCT/US21/70987 filed on Jul. 27, 2021 and claims the benefit of U.S. Provisional Patent Application Ser. No. 63/056,790 filed on Jul. 27, 2020 under 35 U.S.C. § 119, the entire disclosure of each is incorporated herein by reference.

COPYRIGHT

A portion of the disclosure of this patent application contains material that is subject to copyright protection. The copyright owner has no objection to the facsimile reproduction by anyone of the patent application or the patent disclosure, as it appears in the Patent and Trademark Office patent files or records, but otherwise reserves all copyright rights whatsoever.

TECHNOLOGICAL FIELD

The present application generally relates to robotics, and more specifically to systems and methods for preserving data and human confidentiality during feature identification by robotic devices.

SUMMARY

The present disclosure provides, inter alia, systems and methods for preserving data and human confidentiality during feature identification by robotic devices.

Exemplary embodiments described herein have innovative features, no single one of which is indispensable or solely responsible for their desirable attributes. Without limiting the scope of the claims, some of the advantageous features will now be summarized. One skilled in the art would appreciate that as used herein, the term robot may generally refer to an autonomous vehicle or object that travels a route, executes a task, or otherwise moves automatically upon executing or processing computer-readable instructions.

According to at least one non-limiting exemplary embodiment, a method is disclosed. The method may be comprised of a processor of a robotic device: receiving an image from a first sensor of a robotic device during navigation along a route; and identifying features depicted in the image if one or more dynamic objects are not detected within a field of view of the first sensor based on data from a second sensor, wherein the one or more dynamic objects comprises either one or more objects moving in the field of view of the first sensor or one or more objects not localized onto a computer-readable reference map of the robotic device prior to the navigation along the route.

According to at least one non-limiting exemplary embodiment, the method further comprises of the processor: determining if the one or more dynamic objects is either a human being or an inanimate object.

According to at least one non-limiting exemplary embodiment, the second sensor includes a LiDAR sensor, a motion sensor, a thermal imaging camera, an ultrasonic sensor, or depth camera.

According to at least one non-limiting exemplary embodiment, the identification of features further comprises communicating the image to a server external to the robotic device, the server including at least one processor configured to embody one or more models to identify the features within the image.

According to at least one non-limiting exemplary embodiment, the method further comprises of the processor: producing a computer readable map different from the computer-readable reference map, the computer readable map includes the identified features localized thereon, the localization being based on a position of the robotic device during acquisition of the image, the localization being performed by either a processor of the robotic device or the at least one processor of the server.

According to at least one non-limiting exemplary embodiment, the robotic device includes at least one light configurable to illuminate a visual scene of the image.

According to at least one non-limiting exemplary embodiment, the method further comprises of the processor: disabling or dimming the at least one light upon determining the dynamic object comprises a human depicted within the image.

According to at least one non-limiting exemplary embodiment, the second sensor comprises a field of view which overlaps at least in part with the field of view of the first sensor.

According to at least one non-limiting exemplary embodiment, the second sensor includes two or more sensors, the two or more sensors comprise a combined field of view which overlaps at least in part with the field of view of the first sensor.

These and other objects, features, and characteristics of the present disclosure, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosure. As used in the specification and in the claims, the singular form of "a," "an," and "the" include plural referents unless the context clearly dictates otherwise.

BRIEF DESCRIPTION OF THE DRAWINGS

The disclosed aspects will hereinafter be described in conjunction with the appended drawings, provided to illustrate and not to limit the disclosed aspects, wherein like designations denote like elements.

FIG. 5A illustrates a robot identifying features of an object, the object being partially obscured by a human, according to an exemplary embodiment.

Figure 1A:
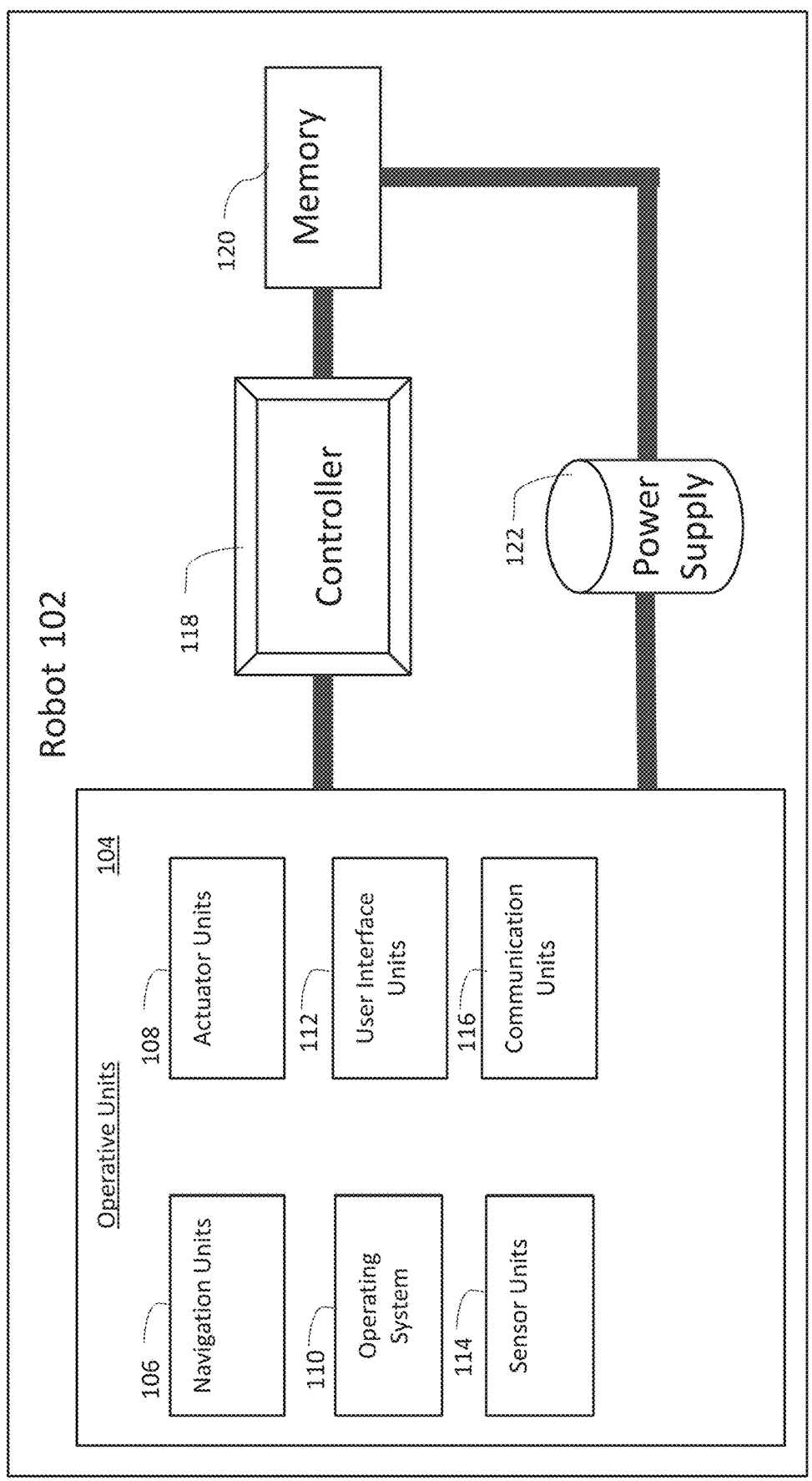
FIG. 1A is a functional block diagram of a main robot in accordance with some embodiments of this disclosure.

All Figures disclosed herein are © Copyright 2021 Brain Corporation. All rights reserved.

DETAILED DESCRIPTION

Currently, robots may utilize one or more trained models or algorithms to identify features within images. Features may include, in short, any discernible characteristic of an object which may be sensed by a sensor. Some robots may be specifically configured to identify these features, such as shelf-scanning robots described herein. Some robots may perform other tasks while identifying features or may rely on feature identification to perform their tasks, such as cleaning robots which may rely on identifications of spills, messes, dirt, etc. within imagery to identify areas to be cleaned. Feature identification may include identifying features within colorized or greyscale images as well as other sensor modalities, such as point clouds. In some instances, these images may depict humans. The humans depicted may not desire to be recorded or have the knowledge that they are being recorded by robots. Accordingly, many feature-detection systems utilize facial censoring methods to preserve confidential information of the humans. Facial censoring, however, may make feature identification difficult or inaccurate because the censored region may obscure or remove important features from imagery. In some implementations, the censoring may cause a negative detection (i.e., a feature is not present) when the feature is present, but obscured by the censored region. Further, partially censored imagery may not be useful in training neural networks to identify features when a substantial portion of training data is lost. Lastly, and most importantly, some features may depict faces themselves (e.g., on product packaging), which may cause facial blurring algorithms to obscure the features when no human is present. Accordingly, there is a need in the art to preserve imagery data which is of use for robots to identify features depicted therein while simultaneously preserving human confidentiality by ensuring humans depicted by imagery of robots remain anonymous.

Various aspects of the novel systems, apparatuses, and methods disclosed herein are described more fully hereinafter with reference to the accompanying drawings. This disclosure can, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art would appreciate that the scope of the disclosure is intended to cover any aspect of the novel systems, apparatuses, and methods disclosed herein, whether implemented independently of, or combined with, any other aspect of the disclosure. For example, an apparatus may be implemented or a method may be practiced using any number of the aspects set forth herein. In addition, the scope of the disclosure is intended to cover such an apparatus or method that is practiced using other structure, functionality, or structure and functionality in addition to or other than the various aspects of the disclosure set forth herein. It should be understood that any aspect disclosed herein may be implemented by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, and/or objectives. The detailed description and drawings are merely illustrative of the disclosure rather than limiting, the scope of the disclosure being defined by the appended claims and equivalents thereof.

The present disclosure provides for systems and methods for data and confidentiality preservation for feature identification by robotic devices. As used herein, a robot may include mechanical and/or virtual entities configured to carry out a complex series of tasks or actions autonomously. In some exemplary embodiments, robots may be machines that are guided and/or instructed by computer programs and/or electronic circuitry. In some exemplary embodiments, robots may include electro-mechanical components that are configured for navigation, where the robot may move from one location to another. Such robots may include autonomous and/or semi-autonomous cars, floor cleaners, rovers, drones, planes, boats, carts, trams, wheelchairs, industrial equipment, stocking machines, mobile platforms, personal transportation devices (e.g., hover boards, scooters, self-balancing vehicles such as manufactured by Segway, etc.), trailer movers, vehicles, and the like. Robots may also include any autonomous and/or semi-autonomous machine for transporting items, people, animals, cargo, freight, objects, luggage, and/or anything desirable from one location to another.

As used herein, a feature may comprise one or more numeric values (e.g., floating point, decimal, a tensor of values, etc.) characterizing an input from a sensor unit including, but not limited to, detection of an object (e.g., humans, couches, cars, cats, etc. represented in point clouds, RGB images, etc.), parameters of the object (e.g., size, shape, color, orientation, edges, etc.), color values of pixels of an image, depth values of pixels of a depth image, brightness of an image, the image as a whole, changes of features over time (e.g., velocity, trajectory, etc. of an object), sounds, spectral energy of a spectrum bandwidth, motor feedback (i.e., encoder values), sensor values (e.g., gyroscope, accelerometer, GPS, magnetometer, etc. readings), a binary categorical variable, an enumerated type, a character/string, or any other characteristic of a sensory input. A feature may be abstracted to any level, for example, an item on a shelf may be a feature of the shelf, the shelf may be a feature of a store, the store may be a feature of a city, and so forth, wherein each of these features may be characterized by a sensor.

As used herein, a false negative detection corresponds to incorrectly detecting a lack of presence of an object. Negative detection corresponds to not detecting an object, wherein the adjective false corresponds to the negative detection being incorrect. For example, a first object may be obscured from view of a sensor behind a second object. From data gathered by the sensor, only the second object is detected, and the first object is not detected, which corresponds to a false negative detection because the first object is present but obscured from view.

As used herein, censoring or blurring of an image may comprise digitally distorting the image or portion thereof such that a censored region provides little to no information. Blurring may additionally include pixilation, distortion, use of black boxes, or other conventional censoring methods.

As used herein, network interfaces may include any signal, data, or software interface with a component, network, or process including, without limitation, those of the FireWire (e.g., FW400, FW800, FWS800T, FWS1600, FWS3200, etc.), universal serial bus ("USB") (e.g., USB 1. X, USB 2.0, USB 3.0, USB Type-C, etc.), Ethernet (e.g., 10/100, 10/100/1000 (Gigabit Ethernet), 10-Gig-E, etc.), multimedia over coax alliance technology ("MoCA"), Coaxsys (e.g., TVNET™), radio frequency tuner (e.g., in-band or OOB, cable modem, etc.), Wi-Fi (802.11), WiMAX (e.g., WiMAX (802.16)), PAN (e.g., PAN/802.15), cellular (e.g., 3G, LTE/LTE-A/TD-LTE/TD-LTE, GSM, etc.), IrDA families, etc. As used herein, Wi-Fi may include one or more of IEEE-Std. 802.11, variants of IEEE-Std. 802.11, standards related to IEEE-Std. 802.11 (e.g., 802.11 a/b/g/n/ac/ad/af/ah/ai/aj/aq/ax/ay), and/or other wireless standards.

As used herein, processor, microprocessor, and/or digital processor may include any type of digital processing device such as, without limitation, digital signal processors ("DSPs"), reduced instruction set computers ("RISC"), complex instruction set computers ("CISC") processors, microprocessors, gate arrays (e.g., field programmable gate arrays ("FPGAs")), programmable logic device ("PLDs"), reconfigurable computer fabrics ("RCFs"), array processors, secure microprocessors, specialized processors (e.g., neuromorphic processors), and application-specific integrated circuits ("ASICs"). Such digital processors may be contained on a single unitary integrated circuit die or distributed across multiple components.

As used herein, computer program and/or software may include any sequence of human or machine cognizable steps that perform a function. Such computer program and/or software may be rendered in any programming language or environment including, for example, C/C++, C#, Fortran, COBOL, MATLAB™, PASCAL, GO, RUST, SCALA, Python, assembly language, markup languages (e.g., HTML, SGML, XML, VoXML), and the like, as well as object-oriented environments such as the Common Object Request Broker Architecture ("CORBA"), JAVA™ (including J2ME, Java Beans, etc.), Binary Runtime Environment (e.g., "BREW"), and the like.

As used herein, connection, link, and/or wireless link may include a causal link between any two or more entities (whether physical or logical/virtual), which enables information exchange between the entities.

As used herein, computer and/or computing device may include, but are not limited to, personal computers ("PCs") and minicomputers, whether desktop, laptop, or otherwise, mainframe computers, workstations, servers, personal digital assistants ("PDAs"), handheld computers, embedded computers, programmable logic devices, personal communicators, tablet computers, mobile devices, portable navigation aids, J2ME equipped devices, cellular telephones, smart phones, personal integrated communication or entertainment devices, and/or any other device capable of executing a set of instructions and processing an incoming data signal.

Detailed descriptions of the various embodiments of the system and methods of the disclosure are now provided. While many examples discussed herein may refer to specific exemplary embodiments, it will be appreciated that the described systems and methods contained herein are applicable to any kind of robot. Myriad other embodiments or uses for the technology described herein would be readily envisaged by those having ordinary skill in the art, given the contents of the present disclosure.

Advantageously, the systems and methods of this disclosure at least: (i) preserve useful imagery for feature identification captured by robots; (ii) preserve human confidentiality in imagery used for feature scanning; (iii) preserve useful and uncensored imagery for training neural networks; (iv) enhance robot task performance by providing safe and secure methods for identifying features within an environment; and (v) enhance the human-robot relation by providing humans with features identified by robots without breaching human confidentiality. Other advantages are readily discernible by one having ordinary skill in the art given the contents of the present disclosure.

FIG. 1A is a functional block diagram of a robot 102 in accordance with some principles of this disclosure. As illustrated in FIG. 1A, robot 102 may include controller 118, memory 120, user interface unit 112, sensor units 114, navigation units 106, actuator unit 108, and communications unit 116, as well as other components and subcomponents (e.g., some of which may not be illustrated). Although a specific embodiment is illustrated in FIG. 1A, it is appreciated that the architecture may be varied in certain embodiments as would be readily apparent to one of ordinary skill given the contents of the present disclosure. As used herein, robot 102 may be representative at least in part of any robot described in this disclosure.

Controller 118 may control the various operations performed by robot 102. Controller 118 may include and/or comprise one or more processors (e.g., microprocessors) and other peripherals. As previously mentioned and used herein, processor, microprocessor, and/or digital processor may include any type of digital processing device such as, without limitation, digital signal processors ("DSPs"), reduced instruction set computers ("RISC"), complex instruction set computers ("CISC"), microprocessors, gate arrays (e.g., field programmable gate arrays ("FPGAs")), programmable logic device ("PLDs"), reconfigurable computer fabrics ("RCFs"), array processors, secure microprocessors and application-specific integrated circuits ("ASICs"). Peripherals may include hardware accelerators configured to perform a specific function using hardware elements such as, without limitation, encryption/description hardware, algebraic processors (e.g., tensor processing units, quadradic problem solvers, multipliers, etc.), data compressors, encoders, arithmetic logic units ("ALU"), and the like. Such digital processors may be contained on a single unitary integrated circuit die, or distributed across multiple components.

Controller 118 may be operatively and/or communicatively coupled to memory 120. Memory 120 may include any type of integrated circuit or other storage device configured to store digital data including, without limitation, read-only memory ("ROM"), random access memory ("RAM"), non-volatile random access memory ("NVRAM"), programmable read-only memory ("PROM"), electrically erasable programmable read-only memory ("EEPROM"), dynamic random-access memory ("DRAM"), Mobile DRAM, synchronous DRAM ("SDRAM"), double data rate SDRAM ("DDR/2 SDRAM"), extended data output ("EDO") RAM, fast page mode RAM ("FPM"), reduced latency DRAM ("RLDRAM"), static RAM ("SRAM"), flash memory (e.g., NAND/NOR), memristor memory, pseudostatic RAM ("PSRAM"), etc. Memory 120 may provide instructions and data to controller 118. For example, memory 120 may be a non-transitory, computer-readable storage apparatus and/or medium having a plurality of instructions stored thereon, the instructions being executable by a processing apparatus (e.g., controller 118) to operate robot 102. In some cases, the instructions may be configured to, when executed by the processing apparatus, cause the processing apparatus to perform the various methods, features, and/or functionality described in this disclosure. Accordingly, controller 118 may perform logical and/or arithmetic operations based on program instructions stored within memory 120. In some cases, the instructions and/or data of memory 120 may be stored in a combination of hardware, some located locally within robot 102, and some located remote from robot 102 (e.g., in a cloud, server, network, etc.).

It should be readily apparent to one of ordinary skill in the art that a processor may be internal to or on board robot 102 and/or may be external to robot 102 and be communicatively coupled to controller 118 of robot 102 utilizing communication units 116 wherein the external processor may receive data from robot 102, process the data, and transmit computer-readable instructions back to controller 118. In at least one non-limiting exemplary embodiment, the processor may be on a remote server (not shown).

In some exemplary embodiments, memory 120, shown in FIG. 1A, may store a library of sensor data. In some cases, the sensor data may be associated at least in part with objects and/or people. In exemplary embodiments, this library may include sensor data related to objects and/or people in different conditions, such as sensor data related to objects and/or people with different compositions (e.g., materials, reflective properties, molecular makeup, etc.), different lighting conditions, angles, sizes, distances, clarity (e.g., blurred, obstructed/occluded, partially off frame, etc.), colors, surroundings, and/or other conditions. The sensor data in the library may be taken by a sensor (e.g., a sensor of sensor units 114 or any other sensor) and/or generated automatically, such as with a computer program that is configured to generate/simulate (e.g., in a virtual world) library sensor data (e.g., which may generate/simulate these library data entirely digitally and/or beginning from actual sensor data) from different lighting conditions, angles, sizes, distances, clarity (e.g., blurred, obstructed/occluded, partially off frame, etc.), colors, surroundings, and/or other conditions. The number of images in the library may depend at least in part on one or more of the amount of available data, the variability of the surrounding environment in which robot 102 operates, the complexity of objects and/or people, the variability in appearance of objects, physical properties of robots, the characteristics of the sensors, and/or the amount of available storage space (e.g., in the library, memory 120, and/or local or remote storage). In exemplary embodiments, at least a portion of the library may be stored on a network (e.g., cloud, server, distributed network, etc.) and/or may not be stored completely within memory 120. As yet another exemplary embodiment, various robots (e.g., that are commonly associated, such as robots by a common manufacturer, user, network, etc.) may be networked so that data captured by individual robots are collectively shared with other robots. In such a fashion, these robots may be configured to learn and/or share sensor data in order to facilitate the ability to readily detect and/or identify errors and/or assist events.

Still referring to FIG. 1A, operative units 104 may be coupled to controller 118, or any other controller, to perform the various operations described in this disclosure. One, more, or none of the modules in operative units 104 may be included in some embodiments. Throughout this disclosure, reference may be to various controllers and/or processors. In some embodiments, a single controller (e.g., controller 118) may serve as the various controllers and/or processors described. In other embodiments different controllers and/or processors may be used, such as controllers and/or processors used particularly for one or more operative units 104. Controller 118 may send and/or receive signals, such as power signals, status signals, data signals, electrical signals, and/or any other desirable signals, including discrete and analog signals to operative units 104. Controller 118 may coordinate and/or manage operative units 104, and/or set timings (e.g., synchronously or asynchronously), turn off/on control power budgets, receive/send network instructions and/or updates, update firmware, send interrogatory signals, receive and/or send statuses, and/or perform any operations for running features of robot 102.

Returning to FIG. 1A, operative units 104 may include various units that perform functions for robot 102. For example, operative units 104 include at least navigation units 106, actuator units 108, user interface units 112, sensor units 114, and communication units 116. Operative units 104 may also comprise other units such as specifically configured task units (not shown) that provide the various functionality of robot 102. In exemplary embodiments, operative units 104 may be instantiated in software, hardware, or both software and hardware. For example, in some cases, units of operative units 104 may comprise computer-implemented instructions executed by a controller. In exemplary embodiments, units of operative unit 104 may comprise hardcoded logic (e.g., ASICS). In exemplary embodiments, units of operative units 104 may comprise both computer-implemented instructions executed by a controller and hardcoded logic. Where operative units 104 are implemented in part in software, operative units 104 may include units/modules of code configured to provide one or more functionalities.

In exemplary embodiments, navigation units 106 may include systems and methods that may computationally construct and update a map of an environment, localize robot 102 (e.g., find the position) in a map, and navigate robot 102 to/from destinations. The mapping may be performed by imposing data obtained in part by sensor units 114 into a computer-readable map representative at least in part of the environment. In exemplary embodiments, a map of an environment may be uploaded to robot 102 through user interface units 112, uploaded wirelessly or through wired connection, or taught to robot 102 by a user.

In exemplary embodiments, navigation units 106 may include components and/or software configured to provide directional instructions for robot 102 to navigate. Navigation units 106 may process maps, routes, and localization information generated by mapping and localization units, data from sensor units 114, and/or other operative units 104.

Still referring to FIG. 1A, actuator units 108 may include actuators such as electric motors, gas motors, driven magnet systems, solenoid/ratchet systems, piezoelectric systems (e.g., inchworm motors), magnetostrictive elements, gesticulation, and/or any way of driving an actuator known in the art. By way of illustration, such actuators may actuate the wheels for robot 102 to navigate a route; navigate around obstacles; rotate cameras and sensors. According to exemplary embodiments, actuator unit 108 may include systems that allow movement of robot 102, such as motorized propulsion. For example, motorized propulsion may move robot 102 in a forward or backward direction, and/or be used at least in part in turning robot 102 (e.g., left, right, and/or any other direction). By way of illustration, actuator unit 108 may control if robot 102 is moving or is stopped and/or allow robot 102 to navigate from one location to another location.

Actuator unit 108 may also include any system used for actuating, in some cases actuating task units to perform tasks. For example, actuator unit 108 may include driven magnet systems, motors/engines (e.g., electric motors, combustion engines, steam engines, and/or any type of motor/engine known in the art), solenoid/ratchet system, piezoelectric system (e.g., an inchworm motor), magnetostrictive elements, gesticulation, and/or any actuator known in the art.

According to exemplary embodiments, sensor units 114 may comprise systems and/or methods that may detect characteristics within and/or around robot 102. Sensor units 114 may comprise a plurality and/or a combination of sensors. Sensor units 114 may include sensors that are internal to robot 102 or external, and/or have components that are partially internal and/or partially external. In some cases, sensor units 114 may include one or more exteroceptive sensors, such as sonars, light detection and ranging ("LiDAR") sensors, radars, lasers, cameras (including video cameras (e.g., red-blue-green ("RBG") cameras, infrared cameras, three-dimensional ("3D") cameras, thermal cameras, etc.)), time of flight ("ToF") cameras, structured light cameras, antennas, motion detectors, microphones, and/or any other sensor known in the art. According to some exemplary embodiments, sensor units 114 may collect raw measurements (e.g., currents, voltages, resistances, gate logic, etc.) and/or transformed measurements (e.g., distances, angles, detected points in obstacles, etc.). In some cases, measurements may be aggregated and/or summarized. Sensor units 114 may generate data based at least in part on distance or height measurements. Such data may be stored in data structures, such as matrices, arrays, queues, lists, stacks, bags, etc.

According to exemplary embodiments, sensor units 114 may include sensors that may measure internal characteristics of robot 102. For example, sensor units 114 may measure temperature, power levels, statuses, and/or any characteristic of robot 102. In some cases, sensor units 114 may be configured to determine the odometry of robot 102. For example, sensor units 114 may include proprioceptive sensors, which may comprise sensors such as accelerometers, inertial measurement units ("IMU"), odometers, gyroscopes, speedometers, cameras (e.g. using visual odometry), clock/timer, and the like. Odometry may facilitate autonomous navigation and/or autonomous actions of robot 102. This odometry may include robot 102's position (e.g., where position may include robot's location, displacement and/or orientation, and may sometimes be interchangeable with the term pose as used herein) relative to the initial location. Such data may be stored in data structures, such as matrices, arrays, queues, lists, stacks, bags, etc. According to exemplary embodiments, the data structure of the sensor data may be called an image.

According to exemplary embodiments, sensor units 114 may be in part external to the robot 102 and coupled to communications units 116. For example, a security camera within an environment of a robot 102 may provide a controller 118 of the robot 102 with a video feed via wired or wireless communication channel(s). In some instances, sensor units 114 may include sensors configured to detect a presence of an object at a location such as, for example without limitation, a pressure or motion sensor may be disposed at a shopping cart storage location of a grocery store, wherein the controller 118 of the robot 102 may utilize data from the pressure or motion sensor to determine if the robot 102 should retrieve more shopping carts for customers.

According to exemplary embodiments, user interface units 112 may be configured to enable a user to interact with robot 102. For example, user interface units 112 may include touch panels, buttons, keypads/keyboards, ports (e.g., universal serial bus ("USB"), digital visual interface ("DVI"), Display Port, E-Sata, Firewire, PS/2, Serial, VGA, SCSI, audioport, high-definition multimedia interface ("HDMI"), personal computer memory card international association ("PCMCIA") ports, memory card ports (e.g., secure digital ("SD") and miniSD), and/or ports for computer-readable medium), mice, rollerballs, consoles, vibrators, audio transducers, and/or any interface for a user to input and/or receive data and/or commands, whether coupled wirelessly or through wires. Users may interact through voice commands or gestures. User interface units 218 may include a display, such as, without limitation, liquid crystal display ("LCDs"), light-emitting diode ("LED") displays, LED LCD displays, in-plane-switching ("IPS") displays, cathode ray tubes, plasma displays, high definition ("HD") panels, 4K displays, retina displays, organic LED displays, touchscreens, surfaces, canvases, and/or any displays, televisions, monitors, panels, and/or devices known in the art for visual presentation. According to exemplary embodiments user interface units 112 may be positioned on the body of robot 102. According to exemplary embodiments, user interface units 112 may be positioned away from the body of robot 102 but may be communicatively coupled to robot 102 (e.g., via communication units including transmitters, receivers, and/or transceivers) directly or indirectly (e.g., through a network, server, and/or a cloud). According to exemplary embodiments, user interface units 112 may include one or more projections of images on a surface (e.g., the floor) proximally located to the robot, e.g., to provide information to the occupant or to people around the robot. The information could be the direction of future movement of the robot, such as an indication of moving forward, left, right, back, at an angle, and/or any other direction. In some cases, such information may utilize arrows, colors, symbols, etc.

According to exemplary embodiments, communications unit 116 may include one or more receivers, transmitters, and/or transceivers. Communications unit 116 may be configured to send/receive a transmission protocol, such as BLUETOOTH®, ZIGBEE®, Wi-Fi, induction wireless data transmission, radio frequencies, radio transmission, radio-frequency identification ("RFID"), near-field communication ("NFC"), infrared, network interfaces, cellular technologies such as 3G (3GPP/3GPP2), high-speed downlink packet access ("HSDPA"), high-speed uplink packet access ("HSUPA"), time division multiple access ("TDMA"), code division multiple access ("CDMA") (e.g., IS-95A, wideband code division multiple access ("WCDMA"), etc.), frequency hopping spread spectrum ("FHSS"), direct sequence spread spectrum ("DSSS"), global system for mobile communication ("GSM"), Personal Area Network ("PAN") (e.g., PAN/ 802.15), worldwide interoperability for microwave access ("WiMAX"), 802.20, long term evolution ("LTE") (e.g., LTE/LTE-A), time division LTE ("TD-LTE"), global system for mobile communication ("GSM"), narrowband/frequency-division multiple access ("FDMA"), orthogonal frequency-division multiplexing ("OFDM"), analog cellular, cellular digital packet data ("CDPD"), satellite systems, millimeter wave or microwave systems, acoustic, infrared (e.g., infrared data association ("IrDA")), and/or any other form of wireless data transmission.

Communications unit 116 may also be configured to send/receive signals utilizing a transmission protocol over wired connections, such as any cable that has a signal line and ground. For example, such cables may include Ethernet cables, coaxial cables, Universal Serial Bus ("USB"), FireWire, and/or any connection known in the art. Such protocols may be used by communications unit 116 to communicate to external systems, such as computers, smart phones, tablets, data capture systems, mobile telecommunications networks, clouds, servers, or the like. Communications unit 116 may be configured to send and receive signals comprising numbers, letters, alphanumeric characters, and/or symbols. In some cases, signals may be encrypted, using algorithms such as 128-bit or 256-bit keys and/or other encryption algorithms complying with standards such as the Advanced Encryption Standard ("AES"), RSA, Data Encryption Standard ("DES"), Triple DES, and the like. Communications unit 116 may be configured to send and receive statuses, commands, and other data/information. For example, communications unit 116 may communicate with a user operator to allow the user to control robot 102. Communications unit 116 may communicate with a server/ network (e.g., a network) in order to allow robot 102 to send data, statuses, commands, and other communications to the server. The server may also be communicatively coupled to computer(s) and/or device(s) that may be used to monitor and/or control robot 102 remotely. Communications unit 116 may also receive updates (e.g., firmware or data updates), data, statuses, commands, and other communications from a server for robot 102.

In exemplary embodiments, operating system 110 may be configured to manage memory 120, controller 118, power supply 122, modules in operative units 104, and/or any software, hardware, and/or features of robot 102. For example, and without limitation, operating system 110 may include device drivers to manage hardware recourses for robot 102 (e.g., allocate memory space for incoming data from sensor units 114, configure processing cores of controller 118, etc.).

In exemplary embodiments, power supply 122 may include one or more batteries, including, without limitation, lithium, lithium ion, nickel-cadmium, nickel-metal hydride, nickel-hydrogen, carbon-zinc, silver-oxide, zinc-carbon, zinc-air, mercury oxide, alkaline, or any other type of battery known in the art. Certain batteries may be rechargeable, such as wirelessly (e.g., by resonant circuit and/or a resonant tank circuit) and/or plugging into an external power source. Power supply 122 may also be any supplier of energy, including wall sockets and electronic devices that convert solar, wind, water, nuclear, hydrogen, gasoline, natural gas, fossil fuels, mechanical energy, steam, and/or any power source into electricity.

One or more of the units described with respect to FIG. 1A (including memory 120, controller 118, sensor units 114, user interface unit 112, actuator unit 108, communications unit 116, mapping and localization unit 126, and/or other units) may be integrated onto robot 102, such as in an integrated system. However, according to some exemplary embodiments, one or more of these units may be part of an attachable module. This module may be attached to an existing apparatus to automate so that it behaves as a robot. Accordingly, the features described in this disclosure with reference to robot 102 may be instantiated in a module that may be attached to an existing apparatus and/or integrated onto robot 102 in an integrated system. Moreover, in some cases, a person having ordinary skill in the art would appreciate from the contents of this disclosure that at least a portion of the features described in this disclosure may also be run remotely, such as in a cloud, network, and/or server.

As used herein, a robot 102, a controller 118, or any other controller, processor, or robot performing a task, operation or transformation illustrated in the figures below comprises a controller executing computer-readable instructions stored on a non-transitory computer-readable storage apparatus, such as memory 120, as would be appreciated by one skilled in the art.

Figure 1B:
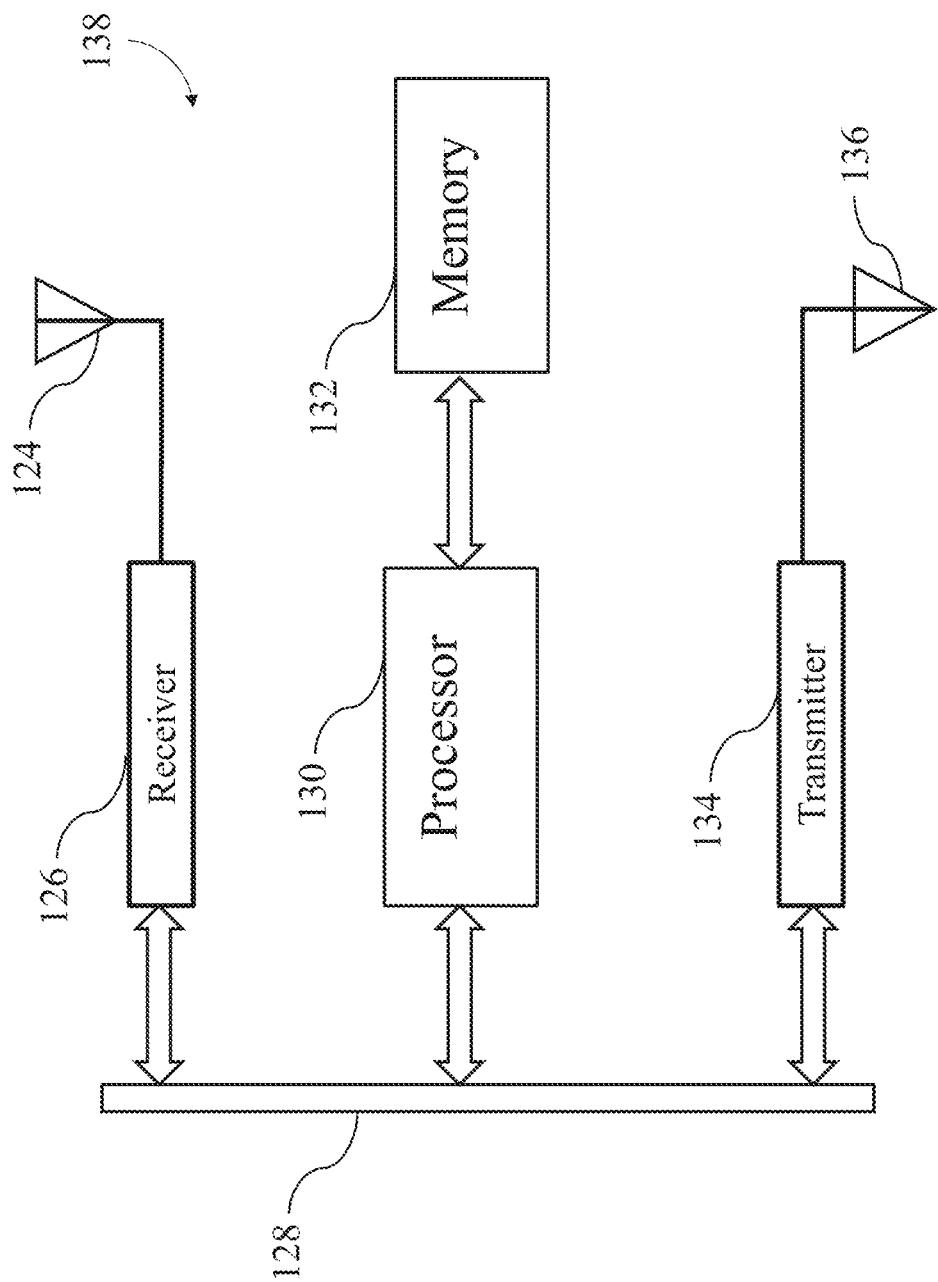
FIG. 1B is a functional block diagram of a controller or processor in accordance with some embodiments of this disclosure.

Next referring to FIG. 1B, the architecture of a processor or processing device 138 is illustrated according to an exemplary embodiment. As illustrated in FIG. 1B, the processor 138 includes a data bus 128, a receiver 126, a transmitter 134, at least one processor 130, and a memory 132. The receiver 126, the processor 130 and the transmitter 134 all communicate with each other via the data bus 128. The processor 130 is configurable to access the memory 132 which stores computer code or computer-readable instructions in order for the processor 130 to execute the specialized algorithms. As illustrated in FIG. 1B, memory 132 may comprise some, none, different, or all of the features of memory 120 previously illustrated in FIG. 1A. The algorithms executed by the processor 130 are discussed in further detail below. The receiver 126 as shown in FIG. 1B is configurable to receive input signals 124. The input signals 124 may comprise signals from a plurality of operative units 104 illustrated in FIG. 1A including, but not limited to, sensor data from sensor units 114, user inputs, motor feedback, external communication signals (e.g., from a remote server), and/or any other signal from an operative unit 104 requiring further processing. The receiver 126 communicates these received signals to the processor 130 via the data bus 128. As one skilled in the art would appreciate, the data bus 128 is the means of communication between the different components—receiver, processor, and transmitter—in the processor. The processor 130 executes the algorithms, as discussed below, by accessing specialized computer-readable instructions from the memory 132. Further detailed description as to the processor 130 executing the specialized algorithms in receiving, processing and transmitting of these signals is discussed above with respect to FIG. 1A. The memory 132 is a storage medium for storing computer code or instructions. The storage medium may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage medium may include volatile, non-volatile, dynamic, static, read/write, read-only, random-access, sequential-access, location-addressable, file-addressable, and/or content-addressable devices. The processor 130 may communicate output signals to transmitter 134 via data bus 128 as illustrated. The transmitter 134 may be configurable to further communicate the output signals to a plurality of operative units 104 illustrated by signal output 136.

One of ordinary skill in the art would appreciate that the architecture illustrated in FIG. 1B may also illustrate an external server architecture configurable to effectuate the control of a robotic apparatus from a remote location, such as server 202 illustrated next in FIG. 2. That is, the server may also include a data bus, a receiver, a transmitter, a processor, and a memory that stores specialized computer-readable instructions thereon.

One of ordinary skill in the art would appreciate that a controller 118 of a robot 102 may include one or more processors 138 and may further include other peripheral devices used for processing information, such as ASICS, DPS, proportional-integral-derivative ("PID") controllers, hardware accelerators (e.g., encryption/decryption hardware), and/or other peripherals (e.g., analog to digital converters) described above in FIG. 1A. The other peripheral devices when instantiated in hardware are commonly used within the art to accelerate specific tasks (e.g., multiplication, encryption, etc.) which may alternatively be performed using the system architecture of FIG. 1B. In some instances, peripheral devices are used as a means for intercommunication between the controller 118 and operative units 104 (e.g., digital to analog converters and/or amplifiers for producing actuator signals). Accordingly, as used herein, the controller 118 executing computer-readable instructions to perform a function may include one or more processors 138 thereof executing computer-readable instructions and, in some instances, the use of any hardware peripherals known within the art. Controller 118 may be illustrative of various processors 138 and peripherals integrated into a single circuit die or distributed to various locations of the robot 102 which receive, process, and output information to/from operative units 104 of the robot 102 to effectuate control of the robot 102 in accordance with instructions stored in a memory 120, 132. For example, controller 118 may include a plurality of processors 138 for performing high-level tasks (e.g., planning a route to avoid obstacles) and processors 138 for performing low-level tasks (e.g., producing actuator signals in accordance with the route).

Figure 2:
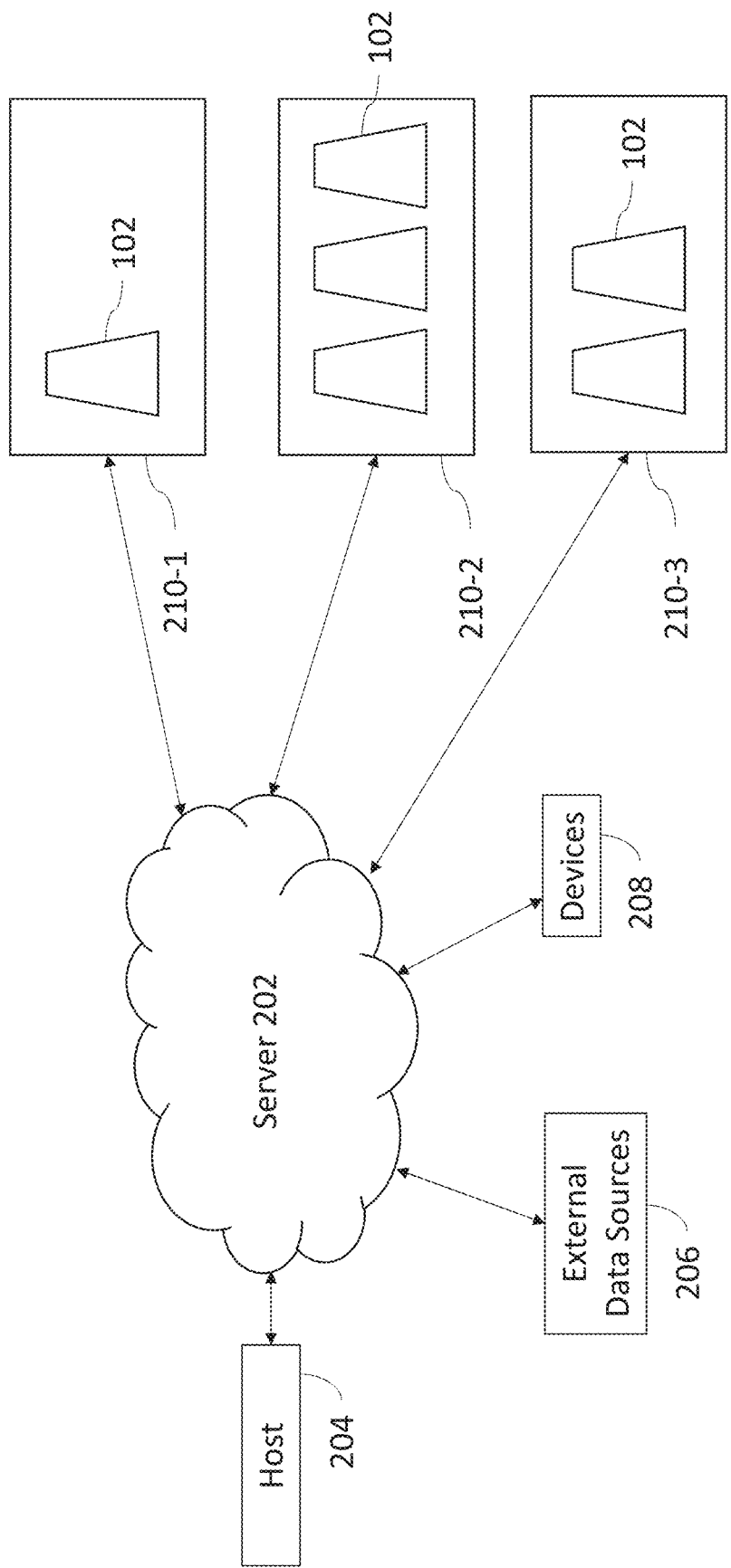
FIG. 2 depicts a server and a plurality of coupled devices and robots in accordance with some embodiments of this disclosure.

FIG. 2 illustrates a server 202 and communicatively coupled components thereof in accordance with some exemplary embodiments of this disclosure. The server 202 may comprise one or more processors depicted in FIG. 1B above, each processor comprising at least one processor 130 and memory 132 therein in addition to, without limitation, any other components illustrated in FIG. 1B. The processors may be centralized at a location or distributed among a plurality of devices across many locations (e.g., a cloud server, distributed network, or dedicated server). For example, computer-readable instructions may be distributed by the server 202 to one or more devices 208 and/or one or more robots 102 for execution on their respective processors 138 (i.e., cloud computing). Communication links between the server 202 and coupled devices may comprise wireless and/or wired communications, wherein the server 202 may further comprise one or more coupled antenna, relays, and/or routers to effectuate the wireless communication. The server 202 may be coupled to a host 204, wherein the host 204 may correspond to a high-level entity (e.g., an administrator) of the server 202. The host 204 may include computerized and/or human entities. The host 204 may, for example, upload software and/or firmware updates for the server 202, coupled devices 208 and/or robot networks 210 via a user interface or terminal. External data sources 206 may comprise any publicly available data sources (e.g., public databases such as weather data from the national oceanic and atmospheric administration ("NOAA"), satellite topology data, public records, etc.) and/or any other databases (e.g., private databases with paid or restricted access) of which the server 202 may access data therein. Devices 208 may comprise any device configurable to perform a task at an edge of the server 202. These devices may include, without limitation, internet of things ("IoT") devices (e.g., stationary CCTV cameras, smart locks, smart thermostats, etc.), external processors (e.g., external CPUs or GPUs), and/or external memories configurable to receive and execute a sequence of computer-readable instructions, which may be provided at least in part by the server 202, and/or store large amounts of data.

Lastly, the server 202 may be coupled to a plurality of robot networks 210, each robot network 210 comprising at least one robot 102. In some embodiments, each network 210 may comprise one or more robots 102 operating within separate environments from other robots 102 of other robot networks 210. An environment may comprise, for example, a section of a building (e.g., a floor or room), an entire building, a street block, or any enclosed and defined space in which the robots 102 operate. In some embodiments, each robot network 210 may comprise a different number of robots 102 and/or may comprise different types of robot 102. For example, network 210-1 may only comprise a robotic wheelchair, and network 210-1 may operate in a home of an owner of the robotic wheelchair or a hospital, whereas network 210-2 may comprise a scrubber robot 102, vacuum robot 102, and a gripper arm robot 102, wherein network 210-3 may operate within a retail store. Alternatively or additionally, in some embodiments, the robot networks 210 may be organized around a common function or type of robot 102. For example, a network 210-3 may comprise a plurality of security or surveillance robots that may or may not operate in a single environment, but are in communication with a central security network linked to server 202. Alternatively or additionally, in some embodiments, a single robot 102 may be a part of two or more networks 210. That is, robot networks 210 are illustrative of any grouping or categorization of a plurality of robots 102 coupled to the server.

Each robot network 210 may communicate data including, but not limited to, sensor data (e.g., RGB images captured, LiDAR scan points, network signal strength data from sensors 202, etc.), IMU data, navigation and route data (e.g., which routes were navigated), localization data of objects within each respective environment, and metadata associated with the sensor, IMU, navigation, and localization data. Each robot 102 within each network 210 may receive communication from the server 202 including, but not limited to, a command to navigate to a specified area, a command to perform a specified task, a request to collect a specified set of data, a sequence of computer-readable instructions to be executed on respective controllers 118 of the robots 102, software updates, and/or firmware updates. One skilled in the art may appreciate that a server 202 may be further coupled to additional relays and/or routers to effectuate communication between the host 204, external data sources 206, devices 208, and robot networks 210 which have been omitted for clarity. It is further appreciated that a server 202 may not exist as a single hardware entity, rather may be illustrative of a distributed network of non-transitory memories and processors (i.e., a cloud server). In some embodiments, a robot network 210, such as network 210-1, may communicate data, e.g. share route and map information, with other networks 210-2 and/or 210-3. In some embodiments, a robot 102 in one network may communicate sensor, route or map information with a robot in a different network. Communication among networks 210 and/or individual robots 102 may be facilitated via server 202, but direct device-to-device communication at any level may also be envisioned. For example, a device 208 may be directly coupled to a robot 102 to enable the device 208 to provide instructions for the robot 102 (e.g., command the robot 102 to navigate a route).

One skilled in the art may appreciate that any determination or calculation described herein may comprise one or more processors/controllers of the server 202, edge devices 208, and/or robots 102 of networks 210 performing the determination or calculation by executing computer-readable instructions. The instructions may be executed by a processor of the server 202 and/or may be communicated to robot networks 210 and/or edge devices 208 for execution on their respective controllers/processors in part or in entirety (i.e., cloud computing). Advantageously, use of a centralized server 202 may enhance a speed at which parameters may be measured, analyzed, and/or calculated by executing the calculations (i.e., computer-readable instructions) on a distributed network of processors on robots 102 and edge devices 208. Use of a distributed network of controllers 118 of robots 102 may further enhance functionality of the robots 102 because the robots 102 may execute instructions on their respective controllers 118 during times when the robots 102 are not in use by operators of the robots 102.

Figure 3:
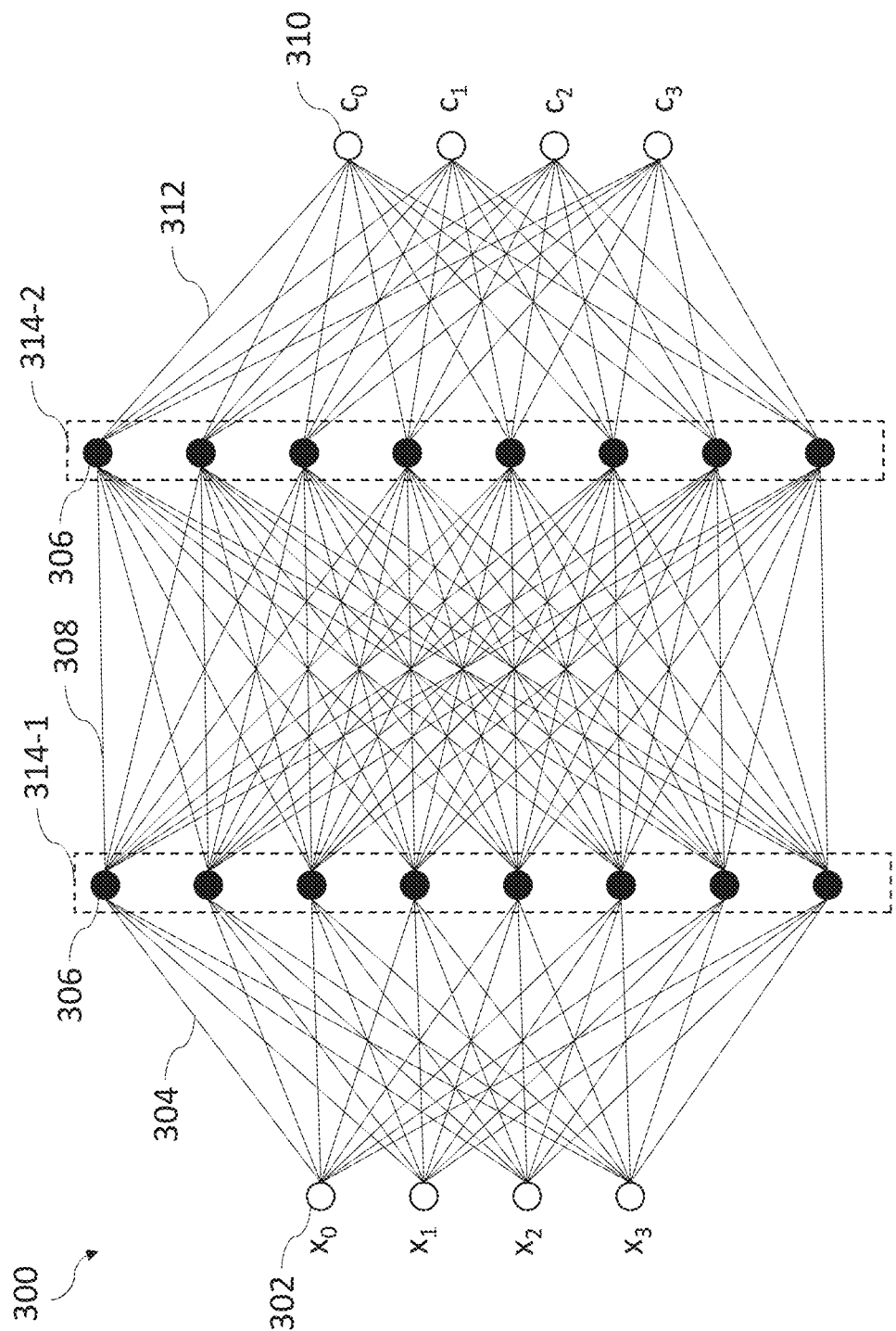
FIG. 3 depicts a neural network used for training a model to identify one or more features, according to an exemplary embodiment.

FIG. 3 illustrates a neural network 300, according to an exemplary embodiment. The neural network 300 may comprise a plurality of input nodes 302, intermediate nodes 306, and output nodes 310, wherein the input nodes 302 may be connected via links 304 to one or more intermediate nodes 306. Some intermediate nodes 306 may be respectively connected via links 308 to one or more adjacent intermediate nodes 306. Some intermediate nodes 306 may be connected via links 312 to output nodes 310. Links 304, 308, 312 illustrate inputs/outputs to/from the nodes 302, 306, and 310 in accordance with Equation 1 below. The intermediate nodes 306 may form an intermediate layer 314 of the neural network 300. In some embodiments, a neural network 300 may comprise a plurality of intermediate layers 314, intermediate nodes 306 of each intermediate layer 314 being linked to one or more intermediate nodes 306 of adjacent layers, unless an adjacent layer is an input layer (i.e., input nodes 302) or an output layer (i.e., output nodes 310). The two intermediate layers 314 illustrated may correspond to a hidden layer or fully connected layer(s) of neural network 300; however hidden layers may comprise more or fewer intermediate layers 314 or intermediate nodes 306. Each node 302, 306, and 310 may be linked to any number of nodes, wherein linking all nodes together as illustrated is not intended to be limiting. For example, the input nodes 302 may be directly linked to one or more output nodes 310.

The input nodes 306 may receive a numeric value $x_i$ of a sensory input of a feature, i being an integer index. For example, $x_i$ may represent color values of an $i^{th}$ pixel of a color image. The input nodes 306 may output the numeric value $x_i$ to one or more intermediate nodes 306 via links 304.

Each intermediate node 306 may be configured to receive a numeric value on its respective input link 304 and output another numeric value $k_{i,j}$ to links 308 following the Equation 1 below:

$$k_{i,j} = a_{i,j}x_0 + b_{i,j}x_1 + c_{i,j}x_2 + d_{i,j}x_3 \qquad \text{(Eqn. 1)}$$

In Equation 1, index i corresponds to a node number within a layer (e.g., $x_1$ denotes the first input node 302 of the input layer, indexing from zero). Index j corresponds to a layer, wherein j would be equal to one for the one intermediate layer 314-1 of the neural network 300 illustrated, however, j may be any number corresponding to a neural network 300 comprising any number of intermediate layers 314. Constants a, b, c, and d represent weights to be learned in accordance with a training process. The number of constants of Equation 1 may depend on the number of input links 304 to a respective intermediate node 306. In this embodiment, all intermediate nodes 306 are linked to all input nodes 302, however this is not intended to be limiting. Intermediate nodes 306 of the second (rightmost) intermediate layer 314-2 may output values $k_{i,2}$ to respective links 312 following Equation 1 above. It is appreciated that constants a, b, c, d may be of different values for each intermediate node 306. Further, although the above Equation 1 utilizes addition of inputs multiplied by respective learned coefficients, other operations are applicable, such as convolution operations, thresholds for input values for producing an output, and/or biases, wherein the above equation is intended to be illustrative and non-limiting. In some embodiments, Equation 1 may further comprise a bias term or value learned during training that does not depend on inputs. In some embodiments, constants a, b, c, and d; inputs $x_i$; and output $k_{i,j}$ may comprise vectors or matrices of values.

Output nodes 310 may be configured to receive at least one numeric value $k_{i,j}$ from at least an $i^{th}$ intermediate node 306 of an intermediate layer 314. As illustrated, for example, each output node 310 receives numeric values $k_{0-7,2}$ from the eight intermediate nodes 306 of the second intermediate layer 314-2. The output of the output nodes 310 may comprise a classification of a feature of the input nodes 302. The output $c_i$ of the output nodes 310 may be calculated following a substantially similar equation as Equation 1 above (i.e., based on learned weights and inputs from connections 312). Following the above example where inputs $x_i$ comprise pixel color values of an RGB image, the output nodes 310 may output a classification $c_i$ of each input pixel (e.g., pixel i is part of an image of a car, train, dog, person, background, soap, or any other classification). Other outputs of the output nodes 310 are considered, such as, for example, output nodes 310 predicting a temperature within an environment at a future time based on temperature measurements provided to input nodes 302 at prior times and/or at different locations.

The training process comprises providing the neural network 300 with both input and output pairs of values to the input nodes 302 and output nodes 310, respectively, such that weights of the intermediate nodes 306 may be determined. An input and output pair used for training include ground truth data comprising values for the input nodes 302 and corresponding correct values for the output nodes 310 (e.g., an image and corresponding annotations or labels). The determined weights configure the neural network 300 to receive input to input nodes 302 and determine a correct output at the output nodes 310. By way of illustrative example, annotated (i.e., labeled) images may be utilized to train a neural network 300 to identify objects or features within the image based on the annotations and the image itself; the annotations may comprise, e.g., pixels encoded with "cat" or "not cat" information if the training is intended to configure the neural network 300 to identify cats within an image. The unannotated images of the training pairs (i.e., pixel RGB color values) may be provided to input nodes 302 and the annotations of the image (i.e., classifications for each pixel) may be provided to the output nodes 310, wherein weights of the intermediate nodes 306 may be adjusted such that the neural network 300 predicts the annotations of the image based on the provided pixel color values to the input nodes 302. This process may be repeated using a substantial number of labeled images (e.g., hundreds or more) such that ideal weights of each intermediate node 306 may be determined. The training process is complete upon predictions made by the neural network 300 falling below a threshold error rate which may be defined using a cost function.

As used herein, a training pair may comprise any set of information provided to input and output of the neural network 300 for use in training the neural network 300. For example, a training pair may comprise an image and one or more labels of the image (e.g., an image depicting a cat and a bounding box associated with a region occupied by the cat within the image).

Neural network 300 may be configured to receive any set of numeric values representative of any feature and provide an output set of numeric values representative of the feature. For example, the inputs may comprise color values of a color image and outputs may comprise classifications for each pixel of the image. As another example, inputs may comprise numeric values for a time-dependent trend of a parameter (e.g., temperature fluctuations within a building measured by a sensor) and output nodes 310 may provide a predicted value for the parameter at a future time based on the observed trends, wherein the trends may be utilized to train the neural network 300. Training of the neural network 300 may comprise providing the neural network 300 with a sufficiently large number of training input/output pairs comprising ground truth (i.e., highly accurate) training data. As a third example, audio information may be provided to input nodes 302 and a meaning of the audio information (e.g., identification of words) may be provided to output nodes 310 to train the neural network 300 to identify words and speech patterns.

Generation of the sufficiently large number of input/output training pairs may be difficult and/or costly to produce. Accordingly, most contemporary neural networks 300 are configured to perform a certain task (e.g., classify a certain type of object within an image) based on training pairs provided, wherein the neural networks 300 may fail at other tasks due to a lack of sufficient training data and other computational factors (e.g., processing power). For example, a neural network 300 may be trained to identify cereal boxes within images, however the same neural network 300 may fail to identify soap bars within the images.

As used herein, a model may comprise the weights of intermediate nodes 306 and output nodes 310 learned during a training process. The model may be analogous to a neural network 300 with fixed weights (e.g., constants a, b, c, d of Equation 1), wherein the values of the fixed weights are learned during the training process. A trained model, as used herein, may include any mathematical model derived based on a training of a neural network 300. One skilled in the art may appreciate that utilizing a model from a trained neural network 300 to perform a function (e.g., identify a feature within sensor data from a robot 102) utilizes significantly less computational resources than training of the neural network 300 as the values of the weights are fixed. This is analogous to using a predetermined equation to solve a problem as compared to determining the equation itself based on a set of inputs and results.

As used herein, a neural network 300 may refer to a neural network as depicted in FIG. 3 (i.e., a fully connected network), a convolutional neural network, feed forward neural network, recurrent neural network, deep convolutional neural network, a generative adversarial network, support vector machines, long-short term memory ("LSTM") networks, auto encoder networks, and/or other conventional neural networks known within the art.

According to at least one non-limiting exemplary embodiment, a neural network 300 may comprise N dimensions for an N-dimensional feature (e.g., a 3-dimensional RGB input image comprises width and height dimensions and three color dimensions), wherein only one dimension has been illustrated for clarity. That is, constants a, b, c, d, and values $x_i$ may be tensors. Similarly, output nodes 310 may produce outputs of M dimensions, M being an integer number of features of which the neural network 300 is configured to identify for example, wherein the output may comprise a histogram of values corresponding to a certainty that a pixel or image as a whole depicts a feature of the histogram.

According to at least one non-limiting exemplary embodiment, one or more outputs $k_{i,j}$ from intermediate nodes 306 of a $j^{th}$ intermediate layer 312 may be utilized as inputs to one or more intermediate nodes 306 of an $m^{th}$ intermediate layer 312, wherein index m may be greater than or less than j (e.g., a recurrent or feed forward neural network). One skilled in the art may appreciate a plurality of other embodiments of a neural network 300, wherein the neural network 300 illustrated represents a simplified embodiment of a neural network to illustrate the structure, utility, and training of neural networks and is not intended to be limiting. The exact configuration of the neural network used may depend on (i) processing resources available, (ii) training data available, (iii) quality of the training data, and/or (iv) difficulty or complexity of the classification/problem. Further, programs such as AutoKeras utilize automatic machine learning ("AutoML") to enable one of ordinary skill in the art to optimize a neural network 300 design to a specified task or data set.

It may be appreciated by one skilled in the art that artificial neural networks are just one of numerous contemporary methods for identifying features within sensor data, such as images or point clouds. Other models may include, without limitation, image libraries, wherein an input is compared to a library of images of a given feature such that similarities (e.g., over a threshold) between the input and the library may indicate the presence of an object. As another example, rather than identifying features in their entirety, curvature analysis may be utilized to detect common contours of features, such as their size, shape, etc., wherein features may be identified based on their similarity to curvatures of other features stored in, e.g., a library.

The figures below may depict various sensors in specific positions on an exemplary embodiment of robot 102. It is appreciated that the position, orientation, and fields of view of these sensors is not intended to be limiting and are illustrative of the broader inventive concepts of this disclosure.

Figure 4A:
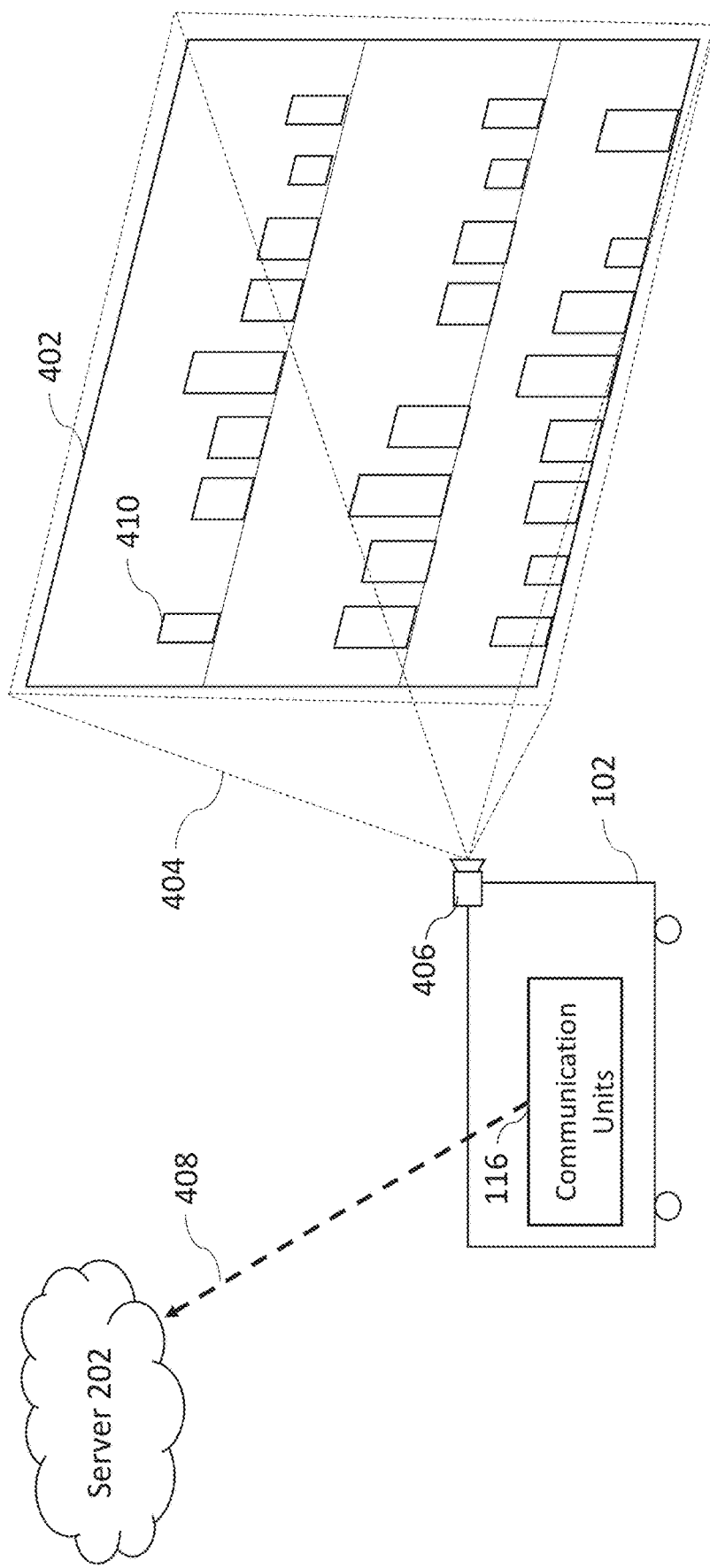
FIGS. 4A-B illustrate a robot identifying features of an object, according to an exemplary embodiment.

FIG. 4A illustrates a robot 102 utilizing a sensor 406 to scan a shelf 402 or object for features 410, according to an exemplary embodiment. The robot 102 may be navigating a route near the shelf 402, wherein sensor 406 may capture an image (e.g., an RGB color image or greyscale image) as the robot 102 navigates nearby. Sensor 406 may include any sensor capable of producing an image, such as an RGB camera, greyscale camera, depth camera, and so forth. The image may be provided to a trained model configurable to identify features 410, such as items on a shelf for example. The trained model may identify one or more of the features 410 based on prior training as discussed above in regard to FIG. 3. The trained model may be executed via processing devices 138 of the server 202 executing computer-readable instructions. Accordingly, communications 408 transmits the image captured by the sensor 406 to the server 202. The image(s) captured by the sensor 406 may include, at least in part, the object 402 as shown by field of view lines 404, however it may be appreciated that field of view of the sensor 406 may be larger, smaller, or at a different angle than depicted and is not intended to be limited to the illustrated embodiment. Further, the sensor 406 may be disposed on any portion of the robot 102 and is not limited to the illustrated position.

One of ordinary skill in the art may appreciate that one or more neural networks and/or trained modules described above may be processed by a controller 118 on the robot 102. One may also appreciate that one or more additional neural networks and/or trained modules may be advantageously processed on processors other than controller 118 of the robot 102.

According to at least one non-limiting exemplary embodiment, the image(s) captured by the sensor 406 may be provided to a server 202 via wired or wireless communication 408, wherein at least one processor or distributed network of processors may process the image to identify features 410 using one or more trained models. Use of the server 202 to process images captured by the sensor 406 in order to detect features 410 depicted therein may be advantageous for robots 102 comprising limited computing resources. Use of the server 202 may be further advantageous for identifying a substantial number of features 410 in complex environments. In some instances, multiple models may be required to identify all features 410 of the object 402. In some instances, a single trained model may be capable of identifying all features 410 of the object 402.

According to at least one non-limiting exemplary embodiment, the trained model may be executed via controller 118 of the robot 102 executing computer-readable instructions, provided the controller 118 and memory 120 comprise the necessary computational resources (e.g., memory space, CPU speed/available threads, etc.) to both execute the models and navigate the robot 102. Thus it is preferred, though not required, for the models to be executed external to the robot 102 as the server 202 may comprise substantially more computational resources than an individual robot 102. Further, upgrading the server 202 to include more computational resources is substantially quicker, easier, and less expensive than upgrading an existing robot 102 (which may be in a remote location from a manufacturer).

Figure 4B:
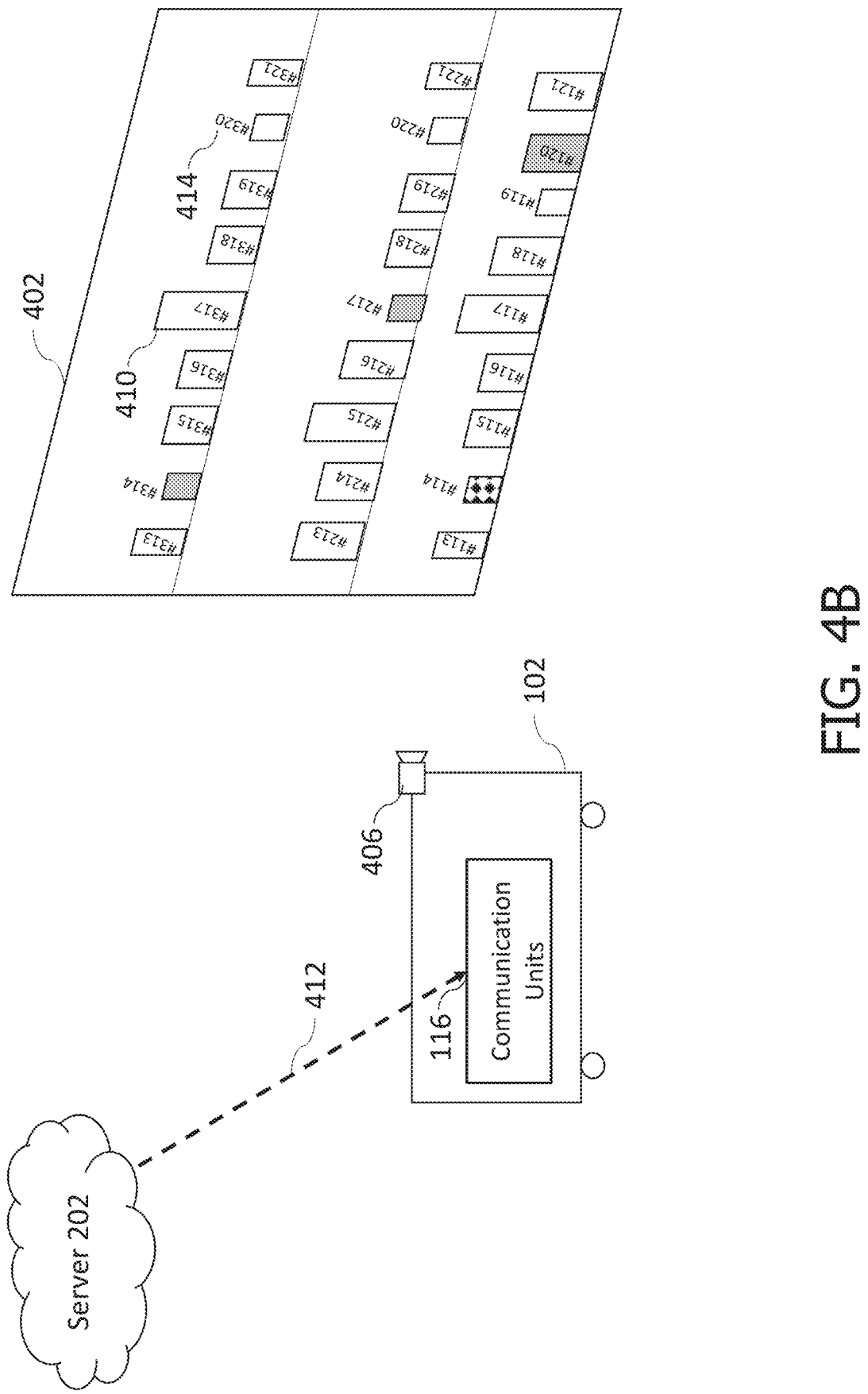

Next, in FIG. 4B, the robot 102 receives a communication 412 via wired or wireless transmission that provides an identification of any or all features 410 within images provided to the server 202 depicted in FIG. 4A, according to an exemplary embodiment. As illustrated, various features 410 have been identified by one or more trained models embodied within the server 202; the various features 410 may each be identified by a shelf-keeping unit ("SKU") number, depicted by numbers 414. SKU numbers 414 may identify a product using a unique number for, e.g., inventory management of a store. It is appreciated that the robot 102 may have navigated away from the object 402 prior to receiving communications 412, wherein the position of the robot 102 viewing the object 402 during receipt of the communications 412 is not intended to be limiting. A controller 118 or processing device 138 of the server 202 may utilize position information of the robot 102 during acquisition of the one or more images (i.e., its position in FIG. 4A) of which feature detection was performed to map the detected features 410 with their respective SKU numbers 414 on a computer-readable map for later reference. One of ordinary skill in the art may appreciate that the communication 412 regarding identification of any or all features within the images may be communicated to any other device in communication with the server such as the host 204, external data sources 206, devices 208, robot networks 210 and/or other robots 102 shown in FIG. 2. For example, the computer-readable map may, in addition to aiding navigation of the robot 102, provide human users with information relating to, for example, out-of-stock items or misplaced items.

According to at least one non-limiting exemplary embodiment, a trained model may be embodied within a controller 138 and memory (e.g., 130, 132 of FIGS. 1A-B) of the robot 102, wherein no communications 412 may be required to identify the features 410 of object 402. The trained model may be configured to identify one or more products by their respective SKU number 414.

According to at least one non-limiting exemplary embodiment, the features 410 may be identified with labels other than SKU numbers 414. For example, the features 410 may be labeled with a name of a product.

It is appreciated by one skilled in the art that identification of SKU numbers of items on a shelf is only illustrative of broader concepts of this disclosure and is not intended to be limiting. Robots 102 may operate in a plurality of environments, each comprising a plurality of features 410 of which identification of these features 410 may be desirable for (i) the robots 102 to enhance operation and/or task performance, and/or (ii) for humans to utilize the identified and localized feature information to enhance workflow and productivity. For example, features 410 may comprise words on a road sign 402, wherein the features may be identified by their respective meaning (i.e., "stop," "yield," etc.) and utilized by robot 102 comprising an autonomous road vehicle to determine commands, such as stop, yield, etc. As another example, features 410 may comprise dirty regions of a wall or floor, wherein the robot 102 may be a cleaning robot configured to identify and clean the dirty regions. As yet another example, features 410 may be characteristic of a landmark or item within an environment, such as e.g., a shop, door, restroom, fire extinguisher, water fountain, etc. in a computer-readable map.

It is common and, in some instances, required within the art of robotics, especially when robots operate in environments which include humans, to ensure images captured by sensor units 114 depicting the humans preserve confidentiality of these humans. Typically, confidentiality is preserved using facial blurring, wherein human faces are identified within images (e.g., using a specially trained face recognition model) and subsequently blurred, pixelated, blacked-out, or otherwise censored, collectively referred to hereinafter as blurring or censoring. The facial blurring is typically performed prior to feature identification to further ensure that human faces are not communicated external to the robot 102 and/or the images are processed minimally without facial blurring (i.e., not stored in memory 120 in an uncensored form). In some environments which comprise many humans, however, facial blurring may distort background information that may be of use for robots 102 and/or their operators. Some environments may comprise features 410 which depict human faces, such as on boxes of cereal or oatmeal in grocery stores. Accordingly, there is a trade-off between preserving confidentiality and extracting useful information from images collected by robots 102, wherein the systems and methods of the present disclosure improve data acquisition for use in feature identification while preserving human confidentiality.

Although the various figures and descriptions provided herein address censoring or blurring of faces of humans, one skilled in the art may appreciate that the present disclosure is equally applicable for more aggressive blurring methods, such as full-body blurring wherein the entire human body (and some immediately surrounding area) are censored.

Figure 5B:
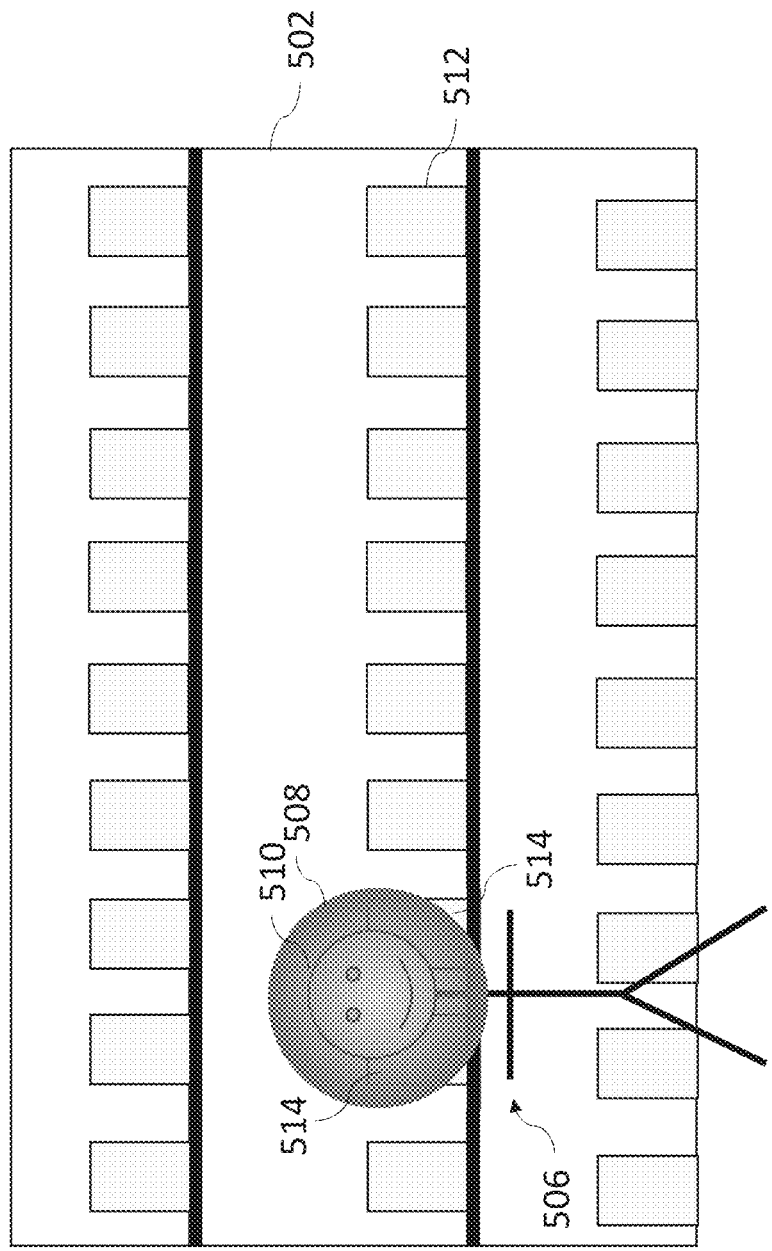
FIG. 5B illustrates an effect of censoring a face of a human on feature identification, according to an exemplary embodiment.

As shown next in FIG. 5A, a robot 102 navigates near an object 502 and utilizes a sensor 406 to capture an image, shown by field of view lines 504, the image depicting in part a human 506, according to an exemplary embodiment. To preserve confidentiality of the human 506, a face of the human 506 may be blurred within the captured image as shown next in FIG. 5B. FIG. 5B depicts an image captured by the sensor 502, the image comprises a blur 508 superimposed over a human face 510, according to an exemplary embodiment. The blur 508 may cover at least the human face 510, wherein the blur 508 typically encompasses additional space as a safety/confidentiality precaution, but this is not always necessary in every embodiment of the present invention. Object 502 may comprise a plurality of features 512 to be identified by, for example, a SKU number 414 or product name. The blur 508, however, obscures one or more of the features 514 from the produced image, thereby making identification of the features 514 impossible, extremely difficult, and/or subject to misidentification as a false negative.

Other portions of the human 506 may obscure other features 512 of the visual scene, such as if full body blurring is utilized over facial blurring. The human 506 may be detected as a "human" as opposed to simply being a "dynamic/moving object" based on detection of arms, hands, legs, feet, walking gait of the human, clothes, a torso, or other portions of the human form based on output from a neural network 300 and data from other sensor units 114, as discussed in FIG. 6 below. In some instances, portions of the human 506 body may be depicted in images captured by sensor units 114 while the face of the human is not depicted (e.g., out of frame), wherein no facial blurring would occur. Even without the censoring of the human 506 body, the human 506 body may obscure features 512 from view of the camera 406, wherein identifying features 514 partially obscured by the human 506 body may lead to incorrect identification, misidentification, or a false "feature missing" output (i.e., a false negative) when the feature 514 is behind the human 506 body.

Failure to identify features 514 may yield unintended consequences. For example, a robot 102 may be configured to, at least in part, scan shelves of a store such that store employees may be notified of out-of-stock items or misplaced items. Obscuring features 514 from view due to blur 508 may cause a trained model to (i) detect no feature 514, which may be perceived or interpreted as the items being out of stock or missing; or (ii) detect the features 514 incorrectly due to blur 508 partially obscuring the features 514, which may be perceived or interpreted as misplaced items. In either of the scenarios (i-ii), a store employee may be called to the location of feature 514 to either replace the items or move the misplaced items only to realize that the correct items were there all along, creating some resentment for robots 102 and wasting their time. Accordingly, the following disclosure provides systems and methods to ensure data collected by robots 102 and later processed by a trained model to identify features yields accurate identification of features while preserving human confidentiality.

FIG. 6 illustrates a robot 102 utilizing a sensor 602, different from sensor 406 illustrated above (not shown in FIG. 6), to determine if a human (e.g., 506) is captured within images captured by sensor 406, according to an exemplary embodiment. Sensor 602 may comprise, for example, a scanning LiDAR sensor, a depth camera, a structured light LiDAR, or other sensor configured to measure distance, depth of field, or otherwise detect presence of and localize objects within an environment of the robot 102. Sensor 406 may still be coupled to the robot 102 and capture images, as shown in FIG. 5A above, wherein the sensor 406 has been omitted for clarity from FIG. 6. Sensor 602 may comprise a field of view which overlaps, at least in part, with a field of view of sensor 406. Sensor 602 may be illustrative of multiple exteroceptive sensor units 114, the multiple sensor units 114 comprising a field of view which includes at least in part a field of view of the sensor 406 such that points 604 are localized.

Sensor 602 may detect a presence of an object 604 between the robot 102 and the object 502. Using one or more computer-readable maps produced, e.g., during prior navigation near the object 502, a controller 118 of the robot 102 may identify that object 502 is always present in substantially the same location and may associate the object 502 with a permanent or fixed object of the environment. In some embodiments, object 502 may be specifically annotated or identified on the computer-readable map as a static object to be scanned by, e.g., an operator of the robot 102. During the present navigation nearby the object 502, sensor 604 may identify an object depicted by points 604. Points 604 may be illustrative of a point cloud or depth data of a depth image. The controller 118 may utilize computer-readable maps produced during prior navigation nearby the object 502, referred to hereinafter as reference map(s), to determine that an object represented by point 604 has not been previously sensed at the illustrated location, wherein the controller 118 may determine the object is a "dynamic object" (i.e., not a permanent static object of the environment). The points 604 may represent a location of dynamic object, such as human 506 depicted in FIG. 5A above, however the controller 118 at this stage has not determined if the dynamic object is simply a new inanimate object in the environment or a human.

Dynamic object, as used herein, may comprise any object localized or detected by a sensor unit 114 which has not been detected in the past nor identified as a permanent or fixed object of the environment. According to at least one non-limiting exemplary embodiment, dynamic objects may be any object that moves, including, e.g. other robots 102, humans 506 or animals such as pets. According to at least one non-limiting exemplary embodiment, dynamic objects may be any object not detected during prior navigation of the robot 102 (e.g., not detected on a reference map). According to at least one non-limiting exemplary embodiment, the robot 102 may be provided with a computer-readable map of its environment depicting all fixed or permanent objects and their respective locations, wherein dynamic objects may comprise any object not localized on the provided reference map and later localized during navigation.

Figure 6:
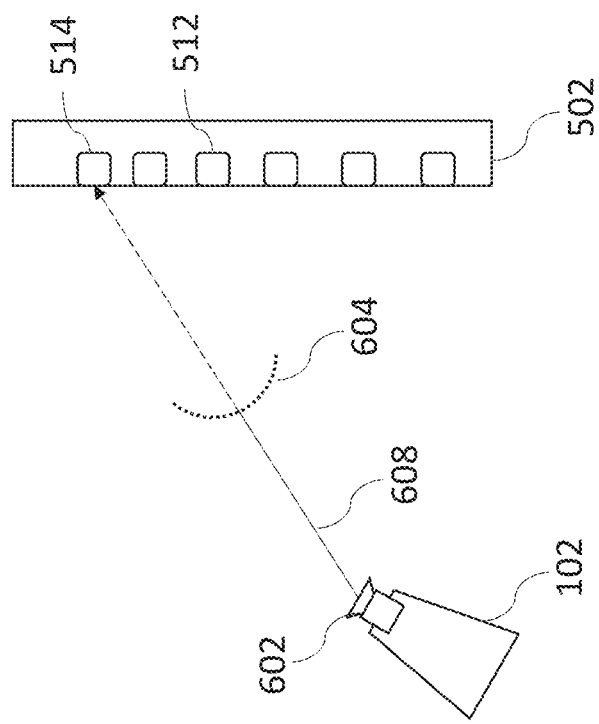
FIG. 6 illustrates a method for detecting dynamic objects which obscure an object and features thereof, according to an exemplary embodiment.

In the embodiment illustrated in FIG. 6, the points 604 may correspond to a surface of a body or face of a human 506 standing between the robot 102 and the object 502, as shown in FIG. 5A for example. As shown by ray 608, the newly identified dynamic object may obscure one or more features 514, ray 608 being encompassed within a field of view of the sensor 406 as shown by field of view lines 504 illustrated in FIG. 5A. The obstruction may be furthered due to a facial blurring region 508, as depicted in FIG. 5B above. Detection of the dynamic object which obscures a view of object 502 may indicate to a controller 118 of the robot 102 that the image(s) captured by sensor 406 at this location may comprise a human face, a human body, or other inanimate object which may obscure one or more features 514 from being depicted in images. According to at least one non-limiting exemplary embodiment, points 604 may represent an inanimate dynamic object such as, for example, a shopping cart temporarily placed between the robot 102 and object 502. Accordingly, the image(s) may be discarded for feature identification but may still be utilized, for example, to navigate the robot 102 (e.g., obstacle avoidance). In some instances, the robot 102 may pass by the dynamic object and still be able to identify features behind it as the robot 102 navigates to a new viewpoint of object 502, however facial blurring would still persist and obscure some features if the dynamic object is determined to be a human.

According to at least one non-limiting exemplary embodiment, a computer-readable map used by controller 118 of robot 102 may further include features 512 identified and localized during prior navigation nearby object 502. Detection of a dynamic object obscuring from view one or more features 514 may comprise the controller 118 identifying that ray 608, or path from robot 102 or sensor 602 to one or more features, passes through an object and/or is included within a field of view of the sensor 406 utilized to capture an image.

According to at least one non-limiting exemplary embodiment, it may be advantageous to discard the image(s) captured for feature identification because the object, human or inanimate, may obscure one or more features 514 from view of the sensor 406. Obscuring the features 514 from view may cause a feature identification model to produce an "item missing" output which may cause store employees or robot operators to try to replace the missing item, only to discover the item was not missing. Thus, it may be advantageous to discard the image(s) captured for use in feature scanning to avoid these false negative detections of features. Discarding the images for feature detection may change the model output from "item missing" to "shelf not scanned," or similar, wherein a human response to the two outputs may be different (i.e., "item missing" may cause a human to try to replace the items whereas "shelf not scanned" may cause the human to do nothing in response to the output).

Figure 7:
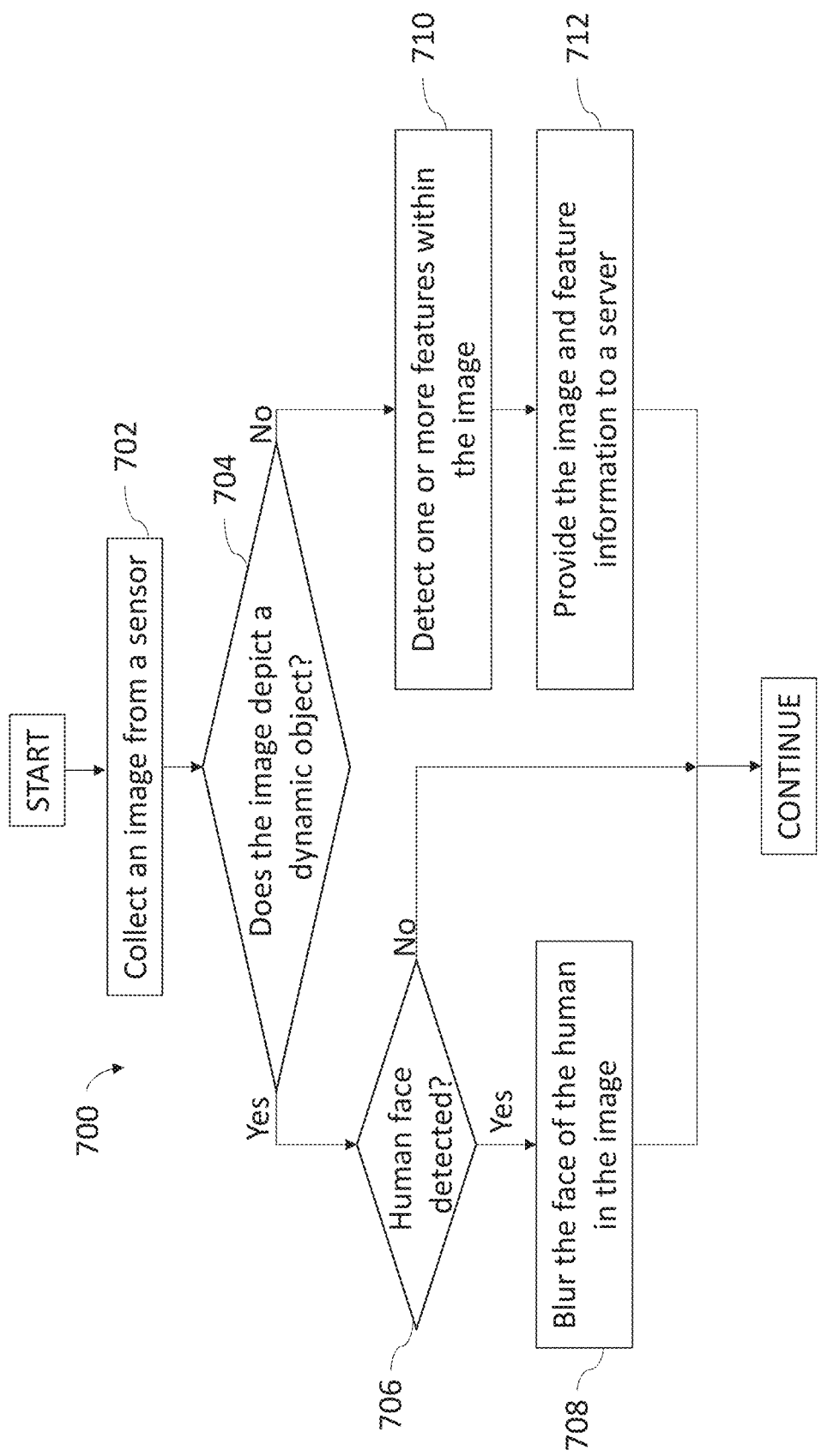
FIG. 7 is a process flow diagram illustrating a method for a processor to determine if a captured image is to be scanned for features or censored, according to an exemplary embodiment.

FIG. 7 is a process flow diagram illustrating a method 700 for preprocessing of an image prior to the image being provided to a trained model for identification of features depicted therein, according to an exemplary embodiment. Method 700 may be executed by controller 118 by executing computer-readable instructions from a non-transitory computer-readable memory 120 coupled thereto. According to at least one non-limiting exemplary embodiment, method 700 (excluding block 702) may be executed by a processing device 138 of a server 202, as will be discussed below.

Block 702 comprises the controller 118 collecting an image from a first sensor. The image may comprise a plurality of pixels. The first sensor may comprise a colorized RGB image camera, a greyscale image camera, a depth camera, or similar imaging device capable of producing images which depict features of objects. The image may be captured as the robot 102 navigates a route.

According to at least one non-limiting exemplary embodiment, wherein a processing device 138 of a server 202 performs the feature identification and facial blurring, computer-readable maps and/or data from other sensors used to detect dynamic objects may also be communicated to the server 202 such that the processing device 138 may perform the determination in block 704 discussed next. Accordingly, the processing device 138 of the server 202 may execute the remaining portion of method 700 including blocks 704-712.

Block 704 comprises the controller 118 determining a dynamic object is detected within the image. A dynamic object may include, but is not limited to, any object which moves by itself (e.g., humans, animals, robots, etc.), inanimate objects which are manipulated by humans or robots (e.g., shopping carts, pallets of items, etc.), and/or any other object which is not a static or permanent object (e.g., shelves, walls, etc.) within the environment. Various methods are discussed below for detecting dynamic objects, none of which is intended to be limiting.

According to at least one non-limiting exemplary embodiment, the first sensor used to collect the image in block 702 may comprise a depth camera configured to produce depth images. Depth images may include a plurality of pixels, each encoded with a color value and a depth/distance measurement. The controller 118 may determine a dynamic object is depicted within the first image based on detecting a difference between the depth measurements (i.e., a point cloud) and a reference map; the reference map may localize a plurality of static objects which are seen in substantially the same location over long periods of time (e.g., days, weeks, etc.) such as walls, shelves, etc.

According to at least one non-limiting exemplary embodiment, the controller 118 may determine a dynamic object is present in the field of view of the first sensor by utilizing a second sensor to detect a location of the dynamic object. The field of view of the first sensor may be known by the controller 118 based on parameters such as, for example, the position of the first sensor on the robot 102, a current zoom value of the first sensor, and/or other intrinsic parameters of the first sensor. In some embodiments, the first sensor may include a fixed field of view stored in memory 120. The second sensor may include one or more distance measuring sensors (e.g., scanning LiDARs, structured light sensors, depth cameras, etc.), presence sensing sensors (e.g., ultrasonic sensors), motion detection sensors, or a combination thereof. Depth cameras may, in some embodiments, be utilized as both the first and second sensors in that depth images produced by the depth cameras may further encode distance information useful for generating a point cloud to detect a presence of the dynamic object, as mentioned previously. In some embodiments, the second sensor may further comprise two or more sensors comprising a combined field of view which overlap, at least in part, with the field of view of the first sensor. The second sensor may provide localization data of objects within an environment to the controller 118, wherein the controller 118 may determine that a dynamic object is located within the field of view of the first sensor based on the fixed field of view of the first sensor, position of the robot 102, and detected location of the dynamic object.

Dynamic objects may be detected upon the controller 118 utilizing data from the second sensor to localize the object and comparing the localization data with a reference map. The reference map may be a computer-readable map of an environment of the robot 102 which comprises localized static objects, or objects which are detected in substantially the same location over time during prior navigation(s) of the route. In some embodiments, a reference map may include static objects detected at substantially the same locations during a navigation of a route a plurality of times. In some embodiments, the reference map may include static objects detected by the robot 102 during navigation of many different routes, wherein the static objects are detected in substantially the same locations. Upon comparing the reference map with current localization data from sensor units 114, the controller 118 may detect a presence of a previously unmapped object and may therefore determine the object comprises a dynamic object.

According to at least one non-limiting exemplary embodiment, the dynamic object may be detected by the controller 118 detecting the object is moving. For example, the controller 118 may detect movement of the dynamic object based on successive scans of a LiDAR, wherein the successive scans may include a grouping of points which move. Other methods for detecting motion of the dynamic object may include the use of the first image sensor detecting movement of an object based on pixel-wise differences in successive images while accounting for motion of the robot 102 in between acquisition of successive images.

According to at least one non-limiting exemplary embodiment, the field of view may be configurable by the controller 118. That is, the field of view of the first sensor being fixed is not intended to be limiting, provided the controller 118 may determine the field of view of the first sensor during acquisition of all images collected by the first sensor such that the controller 118 may determine if a dynamic object is present within the field of view of the first sensor based on data from the second sensor.

According to at least one non-limiting exemplary embodiment, a dynamic object may be detected by the controller 118 comparing the image received in block 702 with one or more images stored in memory 120, the one or more images being collected by the same first sensor during prior navigation at the location of the robot 102. Stated differently, the controller 118 may compare the image received in block 702 with prior images of the same visual scene and determine a dynamic object is present based on the images being substantially different (e.g., greater than a threshold number of pixels comprising different color values).

Upon the controller 118 determining that a dynamic object is detected within the field of view of the first sensor, the controller 118 moves to block 706.

Upon the controller 118 determining that no dynamic object is detected within the field of view of the first sensor, the controller 118 moves to block 710.

Block 706 comprises the controller 118 determining if a human face is detected within the image collected in block 702. The controller 118 may utilize a trained model (e.g., derived from a neural network 300) configured to identify human faces within images.

According to at least one non-limiting exemplary embodiment, the detection of the human face may be performed by a model configured to extract landmarks or key features of a face and comparing the features with a database. For example, the model may identify eyes, cheekbones, a mouth, etc. and compare the relative positions of each feature with a database of human facial features to detect human faces in imagery.

Upon the controller 118 detecting a human face within the image, the controller 118 moves to block 708.

Upon the controller 118 not detecting a human face within the image, the controller 118 continues operating the robot 102 (e.g., continues navigating the route, repeating method 700 upon acquisition of a subsequent image, etc.). It is appreciated that the image is not provided to a server 202 nor trained model embodied on the controller 118 and memory 120 because the dynamic object may obscure from view one or more features which may cause a false negative detection of the feature. Not communicating the image to the server 202 is not intended to be limiting, however one skilled in the art may appreciate that not communicating the image to the server 202 may save both network bandwidth and bandwidth on controller 118, since the image may not be of use for feature identification.

Block 708 comprises the controller 118 blurring the face of the human in the image. The facial recognition model used in block 706 may additionally output a location of the detected human face within the image. In some embodiments, a bounding box may be created around the identified human face. In some embodiments, individual pixels of the image may be classified as "human face" or "not human face," or equivalent verbiage. In some embodiments, the face may be represented by a continuous or discretized function which defines a region occupied by the face within the image. Either of these embodiments of a facial recognition method may utilize the location and size of the face to superimpose a blur 508 or censor the region identified as depicting a human face. The controller 118 may, upon blurring the face of the human 506, continue normal operations (e.g., repeat method 700 upon acquiring a new image). In some embodiments, the censored image may be utilized for a variety of purposes, none of which is intended to be limiting to the disclosure.

According to at least one non-limiting exemplary embodiment, the image may be utilized by the controller 118 for navigation. For example, the robot 102 may perform a predetermined behavior (e.g., slowing down) when a human is detected. As another example, the controller 118 may avoid any dynamic objects depicted within the image.

According to at least one non-limiting exemplary embodiment, the image may be deleted from memory 120 after a predetermined period of time (e.g., 10 minutes), after the robot 102 acquires more than a threshold number of images (e.g., upon collecting 50 GB of image data), or after the robot 102 completes a task (e.g., finishes navigating a route).

According to at least one non-limiting exemplary embodiment, the image, including any censored region(s), may be communicated to the server 202 for a variety of purposes, none of which is intended to be limiting of this disclosure. For example, it may be desirable to identify features even if there is a possibility of false negative detection. As another example, operators of robot 102 may desire to view a camera feed prior to the robot 102 becoming stuck, colliding with an object, or other situations which require human intervention. It is appreciated, however, that no confidential or identifying information of the human depicted in the image is communicated to the server 202 (i.e., the data does not leave internal systems of the robot 102), thereby preserving confidentiality.

Block 710 comprises the controller 118 detecting one or more features within the image captured by the first sensor. The one or more features may be detected by providing the image to one or more trained models, each of the one or more trained models being derived from a neural network 300, discussed above in FIG. 3, trained to identify a specified set of features. The locations of the features within the image may be denoted by bounding boxes, labels of pixels, kernelized functions, discrete pixel-wise functions, tensors, arrays, or similar denotations of area within the image.

Block 712 comprises the controller 118 providing the image and feature information to a server 202 via communications units 116 utilizing a wireless or wired connection. The image and feature information may be of use for the server 202 to, inter alia, provide the feature information to applications or devices 208. The applications or devices 208 may comprise, for example, a store navigation app on a smartphone which guides users to desired products, the products being localized based on the feature identification and a position of the robot 102 during acquisition of the image. As another example, the feature information stored in the server 202 may be of use for store managers or owners to track inventory over periods of time (e.g., days, weeks, etc.) or to provide insights as to which products sell the most or least.

According to at least one non-limiting exemplary embodiment of blocks 710 and 712, upon determining no dynamic objects are present within the image in block 704, controller 118 may utilize communication units 116 to communicate the image to a server 202. The server 202 may comprise one or more processors 130 and/or memories 132 configurable to embody one or more trained models which perform the feature identification. This embodiment may be advantageous for robots 102 comprising low computing resources and/or for identification of a substantial number of different features. In some instances, identified features may be communicated to the robot 102 to enhance navigation and/or task performance of the robot 102, such as providing the locations of target objects, locations of spills for a cleaning robot 102 to clean, and so forth.

Advantageously, the method 700 may enhance feature detection by robots 102 while preserving human confidentiality. It is appreciated that, following method 700, no uncensored images of humans are communicated to the server 202 while only images depicting unobscured features are utilized by the server 202 for feature identification. Providing only unobscured images for feature detection may be advantageous in some instances to avoid false negative detection (i.e., determining an object is missing when it is actually obscured from view). Additionally, providing unobscured images may be of use for training neural networks 300 if the features are more clearly identifiable. In some instances, the features themselves may depict humans (e.g., on cereal boxes, T-shirts, oatmeal, etc.), which may trigger facial blurring to obscure the features within the image. However, the determination in block 704 prevents the features themselves from being a determinant of enabling the facial blurring. Additionally, not communicating images to the server 202 which depict dynamic objects or humans that may obscure features to be identified reduces communications bandwidth used by the robot 102, which may be advantageous in reducing latency of local Wi-Fi networks and/or reducing costs for using cellular data networks. Other advantages are readily discernible by one skilled in the art. A specific application of method 700 to enhance robot 102's functionality and improve human and robot 102 interaction is depicted next in FIGS. 8-9.

Figure 8:
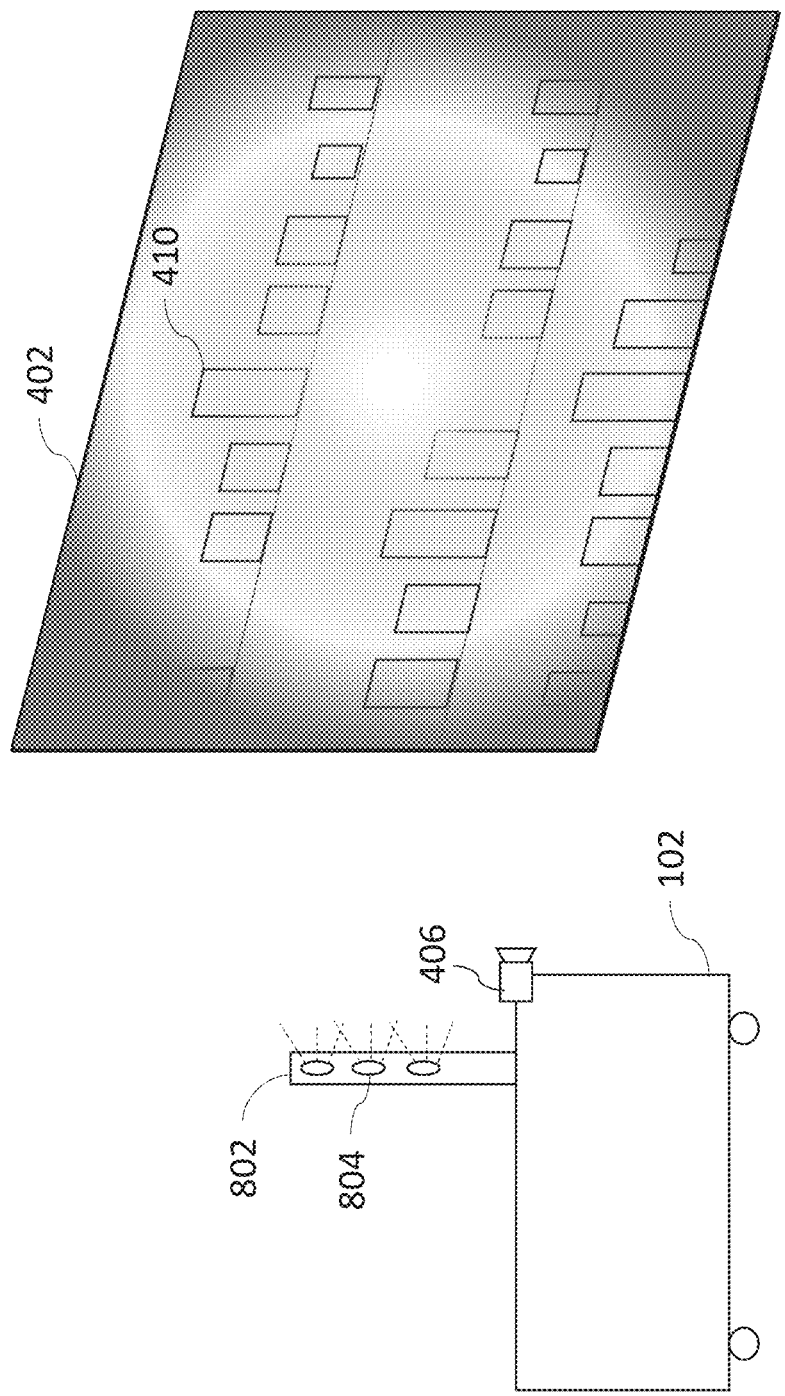
FIG. 8 illustrates a robot utilizing lights to illuminate an object for enhanced feature identification, according to an exemplary embodiment.

FIG. 8 illustrates a robot 102 utilizing a sensor 406 to collect images of an object 402 for use in identifying features 410 of the object 402, according to an exemplary embodiment. Robot 102 may further comprise a light tower 802 comprising one or more lights 804. The lights 804 may emit visible light for use in enhancing clarity of images captured by the sensor 406. The lights 804 may provide substantially uniform illumination of the object 402 which may enhance discernibility of the features 410 thereof in addition to ambient lighting of the environment. In some embodiments, the robot 102 may operate without any ambient lighting such as within a store when the store is closed. Enhancing the discernibility of the features 410 may enable a trained model to more readily identify the features 410 (i.e., with a higher confidence, more accurate bounding boxes, etc.).

According to at least one non-limiting exemplary embodiment, lights 804 may be disposed on other parts of the robot 102 body, wherein the use of a light tower 802 is not intended to be limiting. For example, the lights 804 may be illustrative of a flash of a camera sensor 406.

Lights 804 may be uncomfortable for humans and/or animals if shone while humans/animals are nearby. For example, object 402 may comprise a store shelf, wherein it may be undesirable for a human browsing or stocking the shelf to be illuminated by lights 804. Accordingly, a controller 118 of the robot 102 may execute a method 900 described next in FIG. 9, which is substantially similar to method 700 in FIG. 7 above, to configure enabling and disabling of the lights to accommodate humans and/or animals in the environment of the robot 102.

Figure 9:
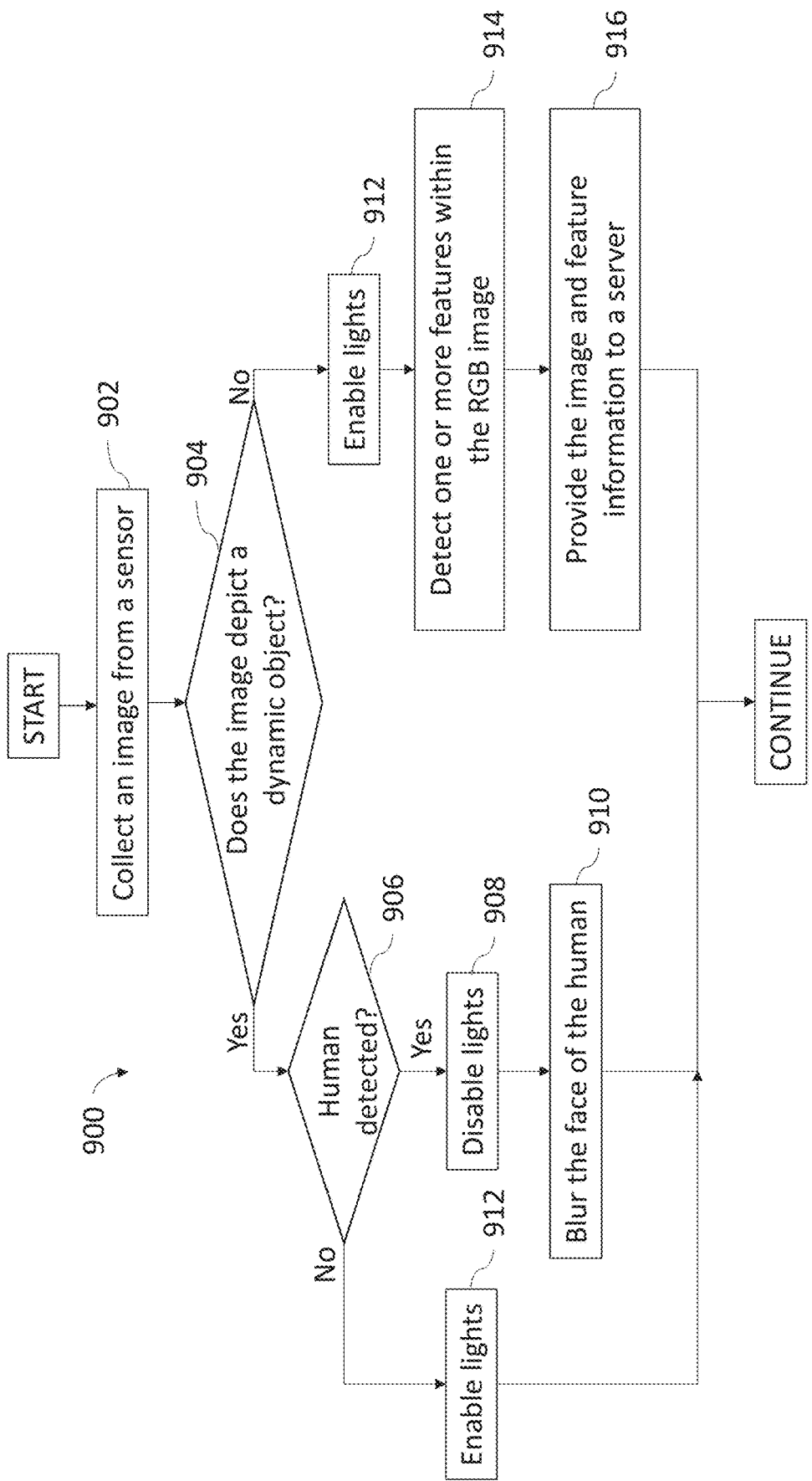
FIG. 9 is a process flow diagram illustrating a method for enabling and disabling of lights of a feature-scanning robot depicted in FIG. 8, according to an exemplary embodiment.

FIG. 9 is a process flow diagram illustrating a method 900 for a controller 118 of a robot 102 to enable or disable lights 804 depicted in FIG. 8 above, according to an exemplary embodiment. Steps of method 900 may be effectuated by the controller 118 executing computer-readable instructions from memory 120. Method 900 begins with lights 804 enabled for the purposes of explanation, however method 900 may be executed with the lights 804 either on or off.

Block 902 comprises the controller 118 collecting an image from a first sensor. The image may comprise a colorized (e.g., RGB) image, greyscale image, depth image, chrominance-luminance image, or any other imaging method for depicting a visual scene. The image may depict, at least in part, an object 402 of which features of the object 402 are to be identified.

Block 904 comprises the controller 118 determining if the image depicts a dynamic object. As mentioned previously above, dynamic objects comprise objects which the sensors 114 of the robot 102 have not previously identified during prior navigation. Various methods are discussed above with respect to FIG. 6 and FIG. 7 for determining if an object is a dynamic object. In short, if a second sensor unit detects an object between the robot 102 and the object 402 which is either moving or is not localized on a reference map, the object may be a dynamic object. The controller 118 may determine the image depicts a dynamic object if the dynamic object is detected within a field of view of the first sensor, the field of view comprising a known area or region due to the first sensor comprising a known field of view (e.g., based on a current zoom value or based on specifications of the specific first sensor) and the position of the robot 102 being known during acquisition of the image (i.e., based on data from navigation units 106).

Upon the controller 118 determining the image depicts a dynamic object, the controller 118 may move to block 906.

Upon the controller 118 determining the image depicts a dynamic object, the controller 118 may move to block 912.

Block 906 comprises the controller 118 determining if the dynamic object is a human. The controller 118 may utilize various methods of determining if the dynamic object is a human known within the art including, without limitation, image recognition (i.e., trained models), data from a thermal imaging camera, or gait pattern detection. The specific method used to detect the human may depend on a specific configuration of sensors of the robot 102 and computing resources available to controller 118. Method 900 may configure the robot 102 to disable the lights 804 upon detection of any human (or animal, in some embodiments) while keeping the lights 804 enabled if the dynamic object detected in block 904 is not a human.

Upon the controller 118 determining the dynamic object is a human, the controller 118 may move to block 908.

Upon the controller 118 determining the dynamic object is not a human, the controller 118 moves to block 912 to continue enabling lights 804 or enable lights 804 if lights 804 were previously disabled, and subsequently continues operation of the robot 102.

Block 908 comprises the controller 118 disabling the lights 804. Disabling of the lights 804 may comprise complete powering off of the lights 804 or reducing power (i.e., dimming) supplied to the lights 804 to a level comfortable to humans.

Block 910 comprises the controller 118 blurring the face of the human. In some instances, the human may be facing away from the robot 102, wherein the facial blurring may not occur. The controller 118 may utilize image recognition (i.e., a trained model) to identify, label, and blur the faces of humans, as discussed above with respect to blocks 706-708 of FIG. 7.

Block 912 comprises the controller 118 enabling the lights 804 upon detecting no dynamic object between the robot 102 and the object 402 of which the features 410 are being detected. If the lights 804 are already enabled, the lights 804 may remain enabled.

Block 914 comprises the controller 118 detecting one or more features within the image captured by the first sensor. The one or more features may be detected by providing the image to one or more trained models, each of the one or more trained models being derived from a neural network 300, discussed above in FIG. 3, trained to identify a specified set of features within the image. The locations of the features within the image may be denoted by bounding boxes, labels of pixels, kernelized functions, discrete pixel-wise functions, or similar denotations of area within the image. Locations of the features within the environment of the robot 102 may further depend on the locations of the bounding boxes or labels and the position of the robot 102 during acquisition of the image.

Block 916 comprises the controller 118 providing the image and feature information to a server 202 via communications units 116 utilizing a wireless or wired connection. The image and feature information may be of use for the server 202 to, inter alia, provide the feature information to applications or devices 208. The applications or devices 208 may comprise, for example, a store navigation app on a smartphone which guides users to desired products, the products being localized based on the feature identification and a position of the robot 102 during acquisition of the image. As another example, the feature information stored in the server 202 may be of use for store managers or owners to track inventory over periods of time (e.g., days, weeks, etc.) or to provide insights as to which products sell the most or least.

According to at least one non-limiting exemplary embodiment of blocks 914 and 916, upon determining no dynamic objects are present within the image in block 904, controller 118 may utilize communication units 116 to communicate the image to a server 202. The server 202 may comprise one or more processors 130 and/or memories 132 configurable to embody one or more trained models which perform the feature identification. This embodiment may be advantageous for robots 102 comprising low computing resources and/or for identification of a substantial number of different features. In some instances, identified features may be communicated to the robot 102 to enhance navigation and/or task performance of the robot 102, such as providing the locations of target objects, locations of spills for a cleaning robot 102 to clean, and so forth.

Figure 10:
FIG. 10 is a truth table, or simply a table, illustrating a determination by a processor to censor an image or scan the image for features, according to an exemplary embodiment.

FIG. 10 illustrates a truth table, or simply a table, 1000 showing the determination made by the controller 118 in methods 700 and 900 above, according to an exemplary embodiment. Vision face recognition may comprise facial recognition within images captured by an imaging camera, such as sensor 406 described in FIGS. 4-6 above. Robot dynamic object recognition corresponds to the controller 118 determining if a dynamic object is depicted within images captured by the imaging camera based on input from a second sensor or the first sensor (e.g., the first sensor being a depth camera) as described in detail with respect to FIG. 7. The second sensor may include one or more exteroceptive sensors configurable to measure distance to or presence of objects surrounding the robot. The robot dynamic object recognition is discussed with respect to blocks 704 of FIG. 7 and 904 of FIG. 9 above and depicted in FIG. 6 using an illustrative exemplary embodiment. In short, if the controller 118 utilizes data other than the acquired image to detect a dynamic object within a field of view of the imaging camera, the robot dynamic object recognition would output a "yes," "true," "1," or other positive indication, and vice versa. Similarly, if the model used to identify human faces within images detects a human face, the vision face recognition may output a "yes," "true," "1," or other positive indication, and vice versa. Discarding an image as used herein with respect to FIG. 10 comprises not utilizing the image for feature recognition, wherein the image may still be utilized by a controller 118 of a robot 102 to navigate and avoid obstacles.

As shown in column one, if for a given image both the vision face recognition and robot dynamic object recognition provide positive indications (i.e., "Yes"), controller 118 may determine that a dynamic object is depicted in the image, wherein the vision face recognition positive indication may denote the dynamic object is a person or there may be human faces elsewhere within the image. The controller 118 may subsequently blur any faces within the image. Feature identification typically does not take place due to the blurring obscuring one or more features (e.g., 514 of FIG. 5B) which may yield false negative detections, misidentifications, and may not be of use for training neural networks 300. The image may still be utilized by the controller 118 for navigating the robot 102 and/or for operators of the robot 102 to view a video feed captured by the first sensor (e.g., to assist the robot 102 and/or determine a cause of failure).

As shown in column two, if for a given image the vision face recognition outputs a positive indication while the robot dynamic object recognition outputs a negative indication, no human or dynamic object is depicted within the given image. The vision face recognition positive indication in this case may correspond to a face being depicted as a feature, such as faces on product packaging. Accordingly, no censoring of the image occurs, and the image may be scanned for features using one or more trained models. Further, the image may be utilized to train additional neural networks 300 to identify additional features within the image because the image includes no censored regions.

As shown in column three, if for a given image the vision face recognition outputs a negative indication and the robot does detect a dynamic object within a field of view of the given image, the image is discarded for feature identification, but the image may still be utilized by the controller 118 for navigating and mapping. This case corresponds to an inanimate object which has not been previously detected or localized onto a computer-readable reference map which obscures the view of the object of which the features are to be identified.

Lastly, as shown in column four, if for a given image the visual face recognition detects no human face within an image from the imaging sensor nor does the robot dynamic object recognition detect a dynamic object, the image may be scanned for features. This may correspond to an ideal scenario for feature identification where the object of interest is unobscured within the image.

In addition to reducing the number of false negative features detected, the embodiments disclosed herein also allow for transmission of the images via less secure data channels. That is, the above disclosure does not presume the robot 102 and server 202 communications to be entirely secure. A secure channel, as used herein, is a communications channel which is in compliance with any data privacy regulations including techniques such as encryption, as well as preserves human confidentiality requirements, wherein no image of a human face or other personal identifiable information ("PII") is seen by any other human. However, if such secure channel may be established, facial blurring may only be required to occur if and only if a human views the images captured by the robot 102, such as a human operator of the robot 102 reviewing the images quality assurance of the feature scanning process. Accordingly, in some embodiments, the controller 118 of the robot 102 and/or processing device 138 of device 208 of which the human operator is viewing the images may utilize the method described herein (e.g., FIG. 7) to blur only real human faces while ensuring product packaging depicting humans is not censored only when another human views the images. There are three instances in which a human may view the images captured by the robot 102: (i) the designer of the robot 102 viewing the image for quality assurance; (ii) designers of image processing models viewing the image for quality assurance and to improve their models; and (iii) a human viewing a final report which details the features seen by the robot 102.

To illustrate further, the controller 118 of the robot 102 may perform method 700 to determine if a human or dynamic object is present within a given image captured of an object 502. However, instead of blurring the image, the controller 118 may encode the image with a human present binary parameter. The human present parameter may comprise a value of 0 or 1 indicating the presence, or lack thereof, of a human/dynamic object within the image. The parameter may be stored as metadata of the captured image, wherein other metadata such as timestamps, sensor identifiers, robot identifiers, and in some instances location where the image is captured are also encoded within the metadata. The image, and corresponding metadata, may be subsequently communicated to the server 202 for feature identification, wherein the server 202 may utilize uncensored images to detect features depicted therein. That is, even if a given input image indicates a human is present, the uncensored image may still be provided to one or more image-processing modules to detect features depicted therein. Once the features are identified, a list or report of features seen by the robot 102 may be sent to a human reviewer, such as a manager, quality assurance associate, or other associates. The report may indicate out of stock, misplaced, or missing items, as well as identifying items which are present in their proper locations. The report may be viewed on a device 208 coupled to the server 202, such as a personal computer, tablet, phone, or other similar device.

For more information on the report, the human reviewer may desire to view images where, for example, a large number of misplaced items are detected. The device 208 of the human reviewer may communicate with the server 202 to receive the images the human reviewer is requesting to see. If the human present binary parameter indicates the presence of a human, the server 202 may communicate a censored version of the image to the device 208. Advantageously, no human reviewing images captured by the robot 102 views PII of any human captured during the imaging of the object 502.

According to at least one non-limiting exemplary embodiment, the feature identification models may be executed by an entity external to the server 202. For example, the server 202 may communicate images to another server 202 hosted by an independent software vendor ("ISV") who specializes in feature identification in images. During normal feature scanning, the images are communicated from the server 202 to the one or more models of the ISV, wherein the ISV provides the images to their models and returns the identified features to the server 202. At no time does a human at the ISV view any raw image as the images are simply provided to the image-processing algorithm and results returned to the server 202. In some instances, the ISV may desire to view some images to further train their models to handle, e.g., edge cases, images of features under different lighting conditions, images at different angles, etc. Accordingly, if the ISV desires to view a raw image, the server 202 must check the human presence parameter and if the parameter indicates the presence of a human, the server 202 will communicate a censored image to the ISV. Advantageously, the systems and methods disclosed above enable secure protection of PII of individuals while enabling an ISV to improve their models using images captured by robots 102 which may depict humans.

Figure 11B:
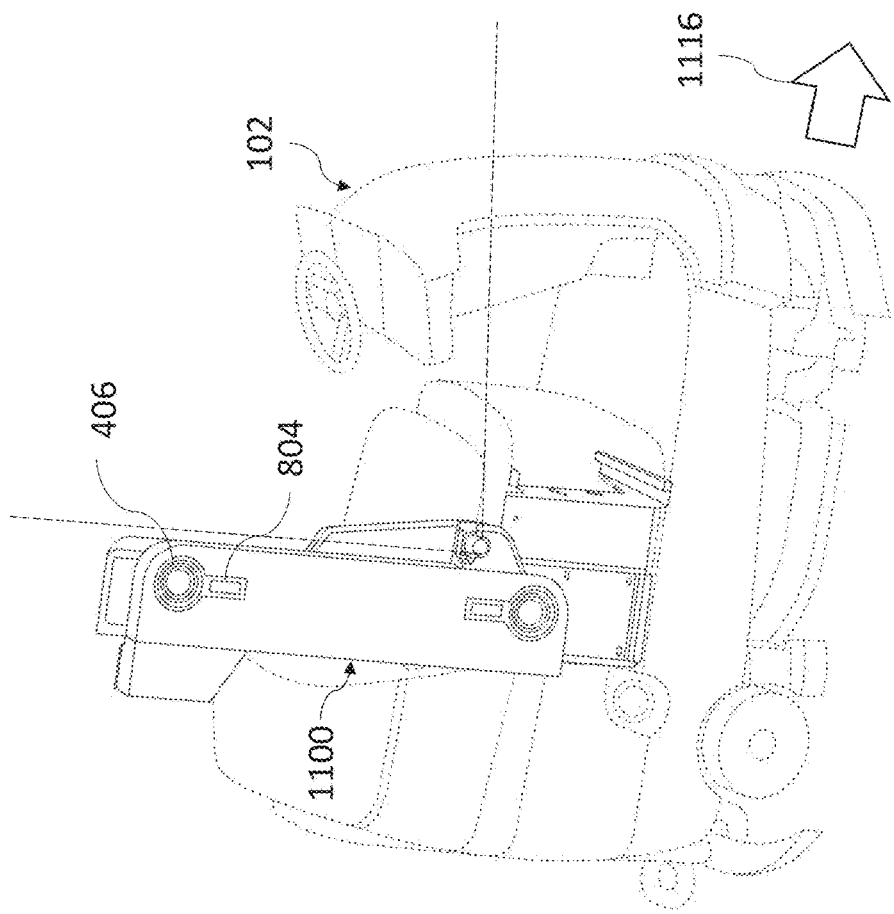
FIG. 11A-B illustrates a feature scanning module in accordance with some exemplary embodiments of the present disclosure.
Figure 11A:
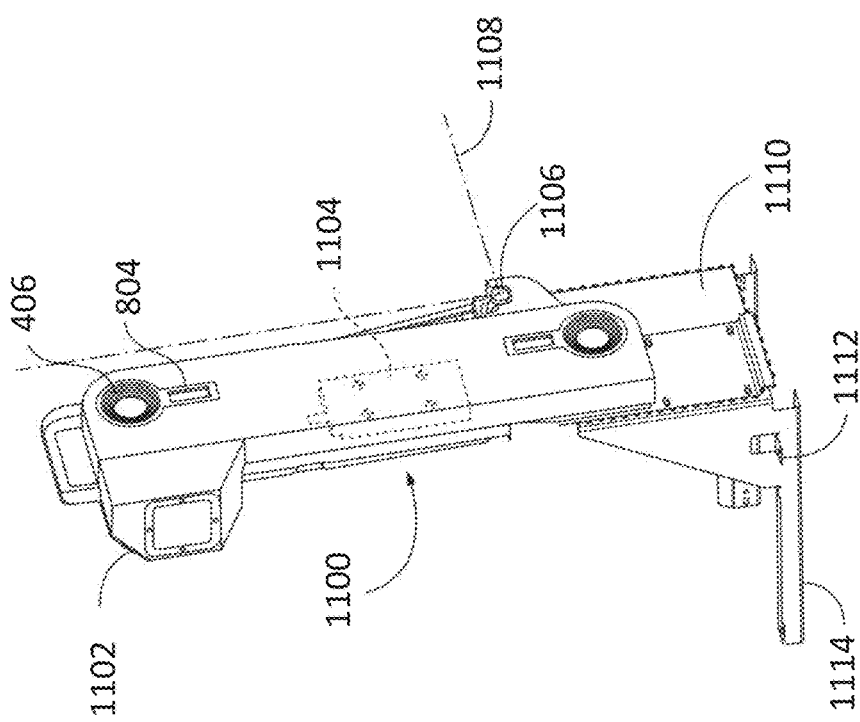

In some embodiments, a feature scanning module 1100 may be coupled to robots 102 to enable the robots 102 to, in addition to their baseline functions, scan for features in their environment. FIG. 11A illustrates a computer-aided design ("CAD") rendering of the feature scanning module 1100, according to an exemplary embodiment. The feature scanning module 1100 may house the various cameras 406 and lights 804 used for feature scanning as described herein. The outer casing is shown as being semi-transparent to enable viewing of the internal components of the module 1100. Device 1104 may house the operative units of the scanning module 1100 such as, for example, processing devices 138, computer-readable memory/memories, power supplies (if the module 1100 is not using the robot 102 power), and communications units. The communications units may comprise Wi-Fi or cellular LTE transceivers configured to communicate with an external server 202 and/or internal operative units 104 of the robot 102.

The module 1100 includes a connection interface comprising hardware data connector ports and physical connector components 1112, 1110. The hardware data connector ports, which are obscured from view from the illustrated perspective, include various ports for data connectors to couple the module 1100 to the controller 118 of the robot 102 such as coaxial cables, USB cables, wires, etc. The physical connector components include longitudinal beams 1110 and screw pads 1112. Screw pads 1112 are configured to house one or more screws to secure the module 1100 to the body of the robot 102. Longitudinal beams 1110 which extend distally from a panel 1110 at the base of the module 1100 provide for horizontal stability of the module 1100 which may be required due to the height of the module 1100.

Longitudinal beams 1110 may further include screw holes for securing the beams 1110 to the robot 102 body. The combination of screw pads 1112 and longitudinal beams 1110 provide the module 1100 with horizontal stability along both horizontal axes. These beams 1110 are inserted into a connection interface of the robot 102, as shown next in FIG. 10B. Once the beams 1110 are inserted, the screw pads 1112 may be secured to the robot 102 body using screws.

As a safety feature, the module 1100 further includes a planar LiDAR sensor 1106. The LiDAR sensor 1106 may comprise a field of view 1108 which encompasses an area above the robot 102 and ahead of the module 1100 along the forward direction of travel of the robot 102, shown next in FIG. 10B. The LiDAR sensor 1106 may enable the robot 102 to sense objects above its body which may collide with the module 1100 due to its added height when coupled to a robot 102, wherein the sensor units 114 of the robot 102 may not be configured to sense this region as, absent the module 1100, the robot 102 is not required to do so to navigate safely.

The module 1100 may further include an upper-steel camera 1102. The upper-steel camera 1102 may be an optional feature configured to image high-up objects, such as tall shelves or upper levels of warehouse shelves. Depending on the environment and objects to be scanned for features, the use of the upper-steel camera 1102 may or may not be necessary. In environments where it is necessary or desired, the upper steel camera 1102 may be coupled to the feature scanning module 1100 to provide extra imaging coverage of the environment. The upper-steel camera 1102 may be angled upward (e.g., at about a 20°-60° angle) with respect to the other one or more cameras 406 of the feature scanning module 1100 to view the tall objects without adding additional height to the feature scanning module 1100. Images captured by the upper-steel camera 1102 module 1100 may be communicated directly to the processing device 138 of the feature scanning module 1100 and handled in the same manner as images captured by cameras 406 as described in FIG. 7 above.

According to at least one non-limiting exemplary embodiment, the upper-steel camera module may be replaced with a 360° camera module.

FIG. 10B illustrates the feature scanning module 1100 coupled to a robot 102, according to an exemplary embodiment. As illustrated, the cameras 406 capture images of objects along the right-hand side of the robot 102, right/left being defined with respect to the forward direction 1116 of the robot 102. It is appreciated that in other embodiments, the module 1100 may be coupled to the left-hand side of the robot 102. Due to the added height of the robot 102 and module 1100 system, the LiDAR sensor 1106 may be utilized to sense a region 1108 ahead of the module 1100 and above the robot 102 body, ahead being along the forward direction 1116. The LiDAR sensor 1106 may detect the presence of any overhead objects which may collide with the module 1100 and, if an object is detected (e.g., by processor 404 processing the LiDAR data), the processor 404 of the module 1100 may communicate with the controller 118 to stop the robot 102 or to navigate around the overhead object.

Longitudinal beams 1110 have been inserted into the robot 102 body, as shown by a dashed outline extending inward to the robot 102 body. The panel 1110 is approximately flush with the outer surface of the robot 102 to provide a protective layer for the internal components of the robot 102. Screw pads 1112, not shown, have also been secured to the robot 102 body using screws. Once the longitudinal beams 1110 and screw pads 1112 are secured, hardware data connectors may be wired from the module 1100 to ports of the robot 102 which communicate with the controller 118 (e.g., motherboard ports).

It will be recognized that while certain aspects of the disclosure are described in terms of a specific sequence of steps of a method, these descriptions are only illustrative of the broader methods of the disclosure, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the disclosure disclosed and claimed herein.

While the above detailed description has shown, described, and pointed out novel features of the disclosure as applied to various exemplary embodiments, it will be understood that various omissions, substitutions, and changes in the form and details of the device or process illustrated may be made by those skilled in the art without departing from the disclosure. The foregoing description is of the best mode presently contemplated of carrying out the disclosure. This description is in no way meant to be limiting, but rather should be taken as illustrative of the general principles of the disclosure. The scope of the disclosure should be determined with reference to the claims.

While the disclosure has been illustrated and described in detail in the drawings and foregoing description, such illustration and description are to be considered illustrative or exemplary and not restrictive. The disclosure is not limited to the disclosed embodiments. Variations to the disclosed embodiments and/or implementations may be understood and effected by those skilled in the art in practicing the claimed disclosure, from a study of the drawings, the disclosure and the appended claims.

It should be noted that the use of particular terminology when describing certain features or aspects of the disclosure should not be taken to imply that the terminology is being re-defined herein to be restricted to include any specific characteristics of the features or aspects of the disclosure with which that terminology is associated. Terms and phrases used in this application, and variations thereof, especially in the appended claims, unless otherwise expressly stated, should be construed as open-ended as opposed to limiting. As examples of the foregoing, the term "including" should be read to mean "including, without limitation," "including but not limited to," or the like; the term "comprising" as used herein is synonymous with "including," "containing," or "characterized by," and is inclusive or open-ended and does not exclude additional, unrecited elements or method steps; the term "having" should be interpreted as "having at least"; the term "such as" should be interpreted as "such as, without limitation"; the term "includes" should be interpreted as "includes but is not limited to"; the term "example" or the abbreviation "e.g." is used to provide exemplary instances of the item in discussion, not an exhaustive or limiting list thereof, and should be interpreted as "example, but without limitation"; the term "illustration" is used to provide illustrative instances of the item in discussion, not an exhaustive or limiting list thereof, and should be interpreted as "illustration, but without limitation"; adjectives such as "known," "normal," "standard," and terms of similar meaning should not be construed as limiting the item described to a given time period or to an item available as of a given time, but instead should be read to encompass known, normal, or standard technologies that may be available or known now or at any time in the future;

and use of terms like "preferably," "preferred," "desired," or "desirable," and words of similar meaning should not be understood as implying that certain features are critical, essential, or even important to the structure or function of the present disclosure, but instead as merely intended to highlight alternative or additional features that may or may not be utilized in a particular embodiment. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should be read as "and/or" unless expressly stated otherwise. The terms "about" or "approximate" and the like are synonymous and are used to indicate that the value modified by the term has an understood range associated with it, where the range may be ±20%, ±15%, ±10%, ±5%, or ±1%. The term "substantially" is used to indicate that a result (e.g., measurement value) is close to a targeted value, where close may mean, for example, the result is within 80% of the value, within 90% of the value, within 95% of the value, or within 99% of the value. Also, as used herein "defined" or "determined" may include "predefined" or "predetermined" and/or otherwise determined values, conditions, thresholds, measurements, and the like.

What is claimed is:

1. A method, comprising:
    receiving an image from a first sensor of a robotic device during navigation along a route;
    determining if one or more dynamic objects is detected in the image within a field of view of the first sensor based on data from a second sensor;
    determining if the one or more dynamic objects is either a human being or an inanimate object;
    determining if a portion of the one or more dynamic objects comprises a human face;
    blurring the portion of the image with the human being, wherein the blurring corresponds to digitally altering the image to censor the portion of the image;
    determining that one or more human faces is not on the human being;
    communicating, to a server, the image without the blurring of the one or more human faces that are within the one or more dynamic objects, and wherein the blurring of the one or more human faces comprises at least one of pixilation and blacking-out the one or more human faces in order to maintain confidentiality of the one or more human faces; and
    identifying features depicted in the image if one or more dynamic objects is not detected within the field of view of the first sensor based on data from the second sensor, wherein the one or more dynamic objects comprises either one or more objects moving in the field of view of the first sensor or one or more objects not localized onto a computer-readable reference map of the robotic device prior to the navigation along the route.

2. The method of claim 1, further comprising:
    determining if the one or more dynamic objects does not comprise a human face.

3. The method of claim 1, wherein the second sensor includes a LIDAR sensor, a motion sensor, a thermal imaging camera, an ultrasonic sensor, or depth camera.

4. The method of claim 1, wherein the identifying of features further comprises communicating the image to a server external to the robotic device if the one or more dynamic objects is not detected in the image, the server including at least one processor configured to embody one or more models to identify the features within the image.

5. The method of claim 4, further comprising:
    producing a computer readable map different from the computer-readable reference map, the computer readable map includes the identified features localized thereon, the localization being based on a position of the robotic device during acquisition of the image, the localization being performed by either a processor of the robotic device or the at least one processor of the server.

6. The method of claim 1, further comprising disabling or dimming at least one light configurable to illuminate a visual scene of the image upon determining the dynamic object comprises a human depicted within the image, wherein the robotic device includes the at least one light.

7. The method of claim 1, wherein, the second sensor comprises a field of view which overlaps at least in part with the field of view of the first sensor.

8. The method of claim 7, wherein, the second sensor includes two or more sensors, the two or more sensors comprise a combined field of view which overlaps at least in part with the field of view of the first sensor.

9. A system, comprising:
    one or more processing devices configured to execute computer readable instructions stored on one or more non-transitory computer readable storage mediums to:
    receive an image from a first sensor of a robotic device;
    determine if a dynamic object is present within a field of view of the first sensor based on data from a second sensor, the second sensor including at least one of a LIDAR sensor, a motion sensor, a thermal imaging camera, an ultrasonic sensor, or depth camera;
    determine if the dynamic object is a human or inanimate object;
    determine if a portion of a human in the image comprises a human face;
    blur, in the image, the portion of the image comprising the human face to maintain confidentiality of the human face, wherein the blurring of the portion of the image corresponds to digitally altering the image to censor the portion of the image;
    determine that one or more human faces is not on a human being;
    communicate, to a server, the image without blurring of the one or more human faces that are within the one or more dynamic objects, and wherein the blurring the portion of the dynamic object comprising the human face comprises at least one of pixilation and blacking-out the one or more human faces in order to maintain the confidentiality of the one or more human faces;
    identify features depicted in the image if no dynamic objects are detected within the field of view; and
    produce a computer readable map, the computer readable map includes the identified features localized thereon, the localization being based on a position of the robot during acquisition of the image if no dynamic objects are detected within the field of view;
    wherein,
        the dynamic object includes one or more objects which are moving or objects not previously localized onto a computer readable reference map; and
        the robotic device includes at least one light configurable to illuminate a visual scene of the image, the at least one light being disabled or dimmed upon determining the dynamic object comprises a human depicted within the image.

10. A non-transitory computer readable storage medium comprising a plurality of computer readable instructions embodied thereon, the instructions, when executed by at least one processor, configure the at least one processor to:

receive an image from a first sensor of a robotic device during navigation along a route; and identify features depicted in the image if one or more dynamic objects are not detected within a field of view of the first sensor based on data from a second sensor, wherein the one or more dynamic objects comprises either one or more objects moving in the field of view of the first sensor or one or more objects not localized onto a computer-readable reference map of the robotic device prior to the navigation along the route;

determine if the one or more dynamic objects is either a human being or an inanimate object;

determine if a portion of the one or more dynamic objects comprises a human face; and blur the portion of the one or more dynamic objects comprising the human face, wherein the blurring of the portion corresponds to digitally altering the image to censor the portion of the image, determine that one or more human faces is not on the human being; and communicate, to a server, the image without blurring of the one or more human faces that are within the one or more dynamic objects, and wherein the blurring of the one or more human faces comprises at least one of pixilation and blacking-out the one or more human faces in order to maintain confidentiality of the one or more human faces.

11. The non-transitory computer readable storage medium of claim 10, further comprising instructions which, when executed, configure the at least one processor to:

determine if the one or more dynamic objects does not comprise a human face.

12. The non-transitory computer readable storage medium of claim 10, wherein, the second sensor includes a LIDAR sensor, a motion sensor, a thermal imaging camera, an ultrasonic sensor, or depth camera.

13. The non-transitory computer readable storage medium of claim 10, wherein, the identifying of features further comprises communicating the image if the one or more dynamic objects is not detected in the image to a server external to the robotic device, the server comprising at least one processor configured to embody one or more models to identify the features within the image.

14. The non-transitory computer readable storage medium of claim 13, further comprising instructions which, when executed, configure the at least one processor to:

produce a computer readable map different from the computer-readable reference map, the computer readable map includes the identified features localized thereon, the localization being based on a position of the robotic device during acquisition of the image, the localization being performed by either a processor of the robotic device or the at least one processor of the server.

15. The non-transitory computer readable storage medium of claim 10, further comprising instructions which, when executed, configure the at least one processor to:

disable or dim at least one light configurable to illuminate a visual scene of the image upon determining the dynamic object comprises a human depicted within the image; wherein the robotic device includes the at least one light.

16. The non-transitory computer readable storage medium of claim 10, wherein, the second sensor comprises a field of view which overlaps at least in part with the field of view of the first sensor.

17. The non-transitory computer readable storage medium of claim 16, wherein, the second sensor includes two or more sensors, the two or more sensors comprise a combined field of view which overlaps at least in part with the field of view of the first sensor.

* * * * *